US012602143B2

(12) United States Patent (10) Patent No.: US 12,602,143 B2
Gutierrez et al. (45) Date of Patent: Apr. 14, 2026

(54) METHODS TO INFER CONTENT RELATIONSHIPS FROM USER ACTIONS AND SYSTEM AUTOMATIONS

(71) Applicant: Comake, Inc., Los Angeles, CA (US)

(72) Inventors: Andres Gutierrez, Los Angeles, CA (US); Adler Faulkner, Los Angeles, CA (US)

(73) Assignee: Comake, Inc., Los Angeles, CA (US)

( * ) Notice: Subject to any disclaimer, the term of this patent is extended or adjusted under 35 U.S.C. 154(b) by 45 days.

(21) Appl. No.: 17/965,650

(22) Filed: Oct. 13, 2022

(65) Prior Publication Data

US 2023/0143597 A1 May 11, 2023

Related U.S. Application Data

(63) Continuation-in-part of application No. 17/707,888, filed on Mar. 29, 2022.

(Continued)

(51) Int. Cl.
*G06F 3/0484* (2022.01)
*G06F 40/134* (2020.01)
*H04L 67/10* (2022.01)

(52) U.S. Cl.
CPC .......... *G06F 3/0484* (2013.01); *G06F 40/134* (2020.01); *H04L 67/10* (2013.01)

(58) Field of Classification Search
CPC .... G06F 16/951; G06F 16/71; G06F 16/9024; G06F 16/9566; G06F 16/137;

(Continued)

(56) References Cited

U.S. PATENT DOCUMENTS 5,872,973 A 2/1999 Mitchell et al.
6,370,537 B1 4/2002 Gilbert et al.
(Continued)

FOREIGN PATENT DOCUMENTS

WO WO-2021/127550 A1 6/2021
WO WO-2023/122344 A1 6/2023
WO WO-2025/029343 A1 2/2025

OTHER PUBLICATIONS

Ives et al. "Interactive Data Integration through Smart Copy & Paste" National Electronics and Computer Technology Center CIDR 2009 (Year: 2009).*

(Continued)

*Primary Examiner* — Ajay M Bhatia
*Assistant Examiner* — Berhanu Mitiku
(74) *Attorney, Agent, or Firm* — Foley & Lardner LLP

(57) ABSTRACT

Disclosed herein are methods and systems to identify and infer relationship between data using user interactions. A method comprises monitoring interactions by a user associated with first electronic content and second electronic content presented on a computing device; revising a link between a pair of nodes within a set of nodes of a nodal data structure based the monitored interactions, the pair of nodes comprising a first node associated with the first electronic content and a second node associated with the second electronic content; in response to receiving a request for electronic content from the computing device: determining at least one node within the set of nodes of the nodal data structure that corresponds to the request; and providing data associated with the at least one node and additional data associated with any other node linked to the at least one node.

20 Claims, 17 Drawing Sheets

Related U.S. Application Data

(60) Provisional application No. 63/255,401, filed on Oct. 13, 2021.

(58) Field of Classification Search
CPC ............. G06F 16/9535; G06F 16/2428; G06F 16/2465; G06F 16/275; G06F 16/3331; G06F 16/24578; G06F 16/248; G06F 16/9538; G06F 16/9536; G06F 3/0484; G06F 40/134; G06F 8/60; G06F 9/46; G06F 16/36; G06F 16/26; G06F 16/211; G06F 16/287; G06F 16/288; H04L 67/10
See application file for complete search history.

(56) References Cited

U.S. PATENT DOCUMENTS

| | | | |
|---|---|---|---|
| 7,099,885 | B2 | 8/2006 | Hellman et al. |
| 7,162,427 | B1 | 1/2007 | Myrick et al. |
| 7,340,726 | B1 | 3/2008 | Chelf et al. |
| 7,424,701 | B2 | 9/2008 | Kendall et al. |
| 9,201,966 | B2 | 12/2015 | Lundberg |
| 9,715,518 | B2 | 7/2017 | Ducott, III et al. |
| 10,467,344 | B1 | 11/2019 | Jade et al. |
| 10,762,060 | B1 * | 9/2020 | Faulkner ................... G06F 7/14 |
| 11,314,692 | B1 | 4/2022 | Gutierrez et al. |
| 11,409,820 | B1 | 8/2022 | Gutierrez et al. |
| 11,586,591 | B1 | 2/2023 | Gutierrez et al. |
| 11,720,642 | B1 | 8/2023 | Gutierrez et al. |
| 11,741,115 | B2 | 8/2023 | Gutierrez et al. |
| 2003/0028370 | A1 | 2/2003 | Leffert |
| 2003/0179228 | A1 | 9/2003 | Schreiber et al. |
| 2003/0216919 | A1 | 11/2003 | Roushar |
| 2008/0172440 | A1 | 7/2008 | Jagannathan |
| 2008/0294426 | A1 | 11/2008 | Evans et al. |
| 2009/0138454 | A1 | 5/2009 | Rayner et al. |
| 2012/0047149 | A1 | 2/2012 | Zhou et al. |
| 2013/0117219 | A1 | 5/2013 | Malka et al. |
| 2014/0136531 | A1 | 5/2014 | Aflalo et al. |
| 2016/0042058 | A1 | 2/2016 | Nguyen |
| 2016/0308982 | A1 | 10/2016 | Greene |
| 2016/0335314 | A1 | 11/2016 | Grigoreva et al. |
| 2017/0177310 | A1 | 6/2017 | Mathias et al. |
| 2018/0196812 | A1 * | 7/2018 | Gupta ................... G06F 40/284 |
| 2018/0232445 | A1 | 8/2018 | Gomadam et al. |
| 2018/0341371 | A1 * | 11/2018 | Callaghan ............. G06F 40/177 |
| 2019/0050378 | A1 * | 2/2019 | Novak ................. G06F 40/143 |
| 2019/0087691 | A1 | 3/2019 | Jelveh |
| 2019/0361860 | A1 | 11/2019 | Rogynskyy et al. |
| 2019/0361934 | A1 * | 11/2019 | Rogynsky |
| 2019/0370812 | A1 * | 12/2019 | Kandasamy ....... G06Q 20/4093 |
| 2020/0234155 | A1 | 7/2020 | Ares et al. |
| 2020/0334313 | A1 * | 10/2020 | Kussmaul ............. G06F 16/951 |
| 2021/0248534 | A1 * | 8/2021 | Ares ..................... G06F 16/254 |
| 2021/0405959 | A1 * | 12/2021 | Lovitt .................... G06F 3/165 |
| 2022/0050864 | A1 | 2/2022 | Osmon et al. |
| 2022/0164683 | A1 | 5/2022 | Hao et al. |
| 2022/0269790 | A1 | 8/2022 | Rajana et al. |
| 2022/0309037 | A1 | 9/2022 | Gutierrez et al. |
| 2023/0143597 | A1 | 5/2023 | Gutierrez et al. |
| 2023/0252233 | A1 | 8/2023 | Gutierrez et al. |

OTHER PUBLICATIONS

Marquardt et al. "Designing User-, Hand-, and Handpart-Aware Tabletop Interactions with TOUCHID Toolkit" Research Report 2011-1004-16, Department of Computer Science, University of Calgary, Calgary, AB, Canada T2N 1N4, July. (Year: 2011).*

"Speech Recognition", Web Accessibility Initiative (WAI), W3C, retrieved Oct. 27, 2021 from URL: https://www.w3.org/WAI/perspective-videos/voice/ (6 pages).

"Surfingkeys", Chrome Web Store, retrieved Oct. 27, 2021 from URL: https://chrome.google.com/webstore/detail/surfingkeys/gfbliohnnapiefjpjlpjnehglfpaknnc?hl=en-US (6 pages).

"Using the Web Speech API", Mdn Web Docs, Mozilla, retrieved Oct. 27, 2021 from URL: https://developer.mozilla.org/en-US/docs/Web/API/Web_Speech_API/Using_the_Web_Speech_API (13 pages).

"Vimium", Chrome Web Store, retrieved Oct. 27, 2021 from URL: https://chrome.google.com/webstore/detail/vimium/dbepggeogbaibhgnhhndojpepiihcmeb?hl=en (6 pages).

Scanagatta et al. "A Survey on Bayesian network structure learning from data" Department of Informatics, Systems and Communication, University of Milan-Bicocca, Milano, Italy, May 14, 2019 (Year: 2019).

International Preliminary Report on Patentability for PCT App. PCT/US2022/022341 dated Oct. 3, 2023 (7 pages).

"Action", https://schema.org/Action, visited on Dec. 28, 2022.

"Automatically Categorized Bookmarks", Stash, 2020, 7 pages, visited on Mar. 26, 2021.

"Block Protocol", https://blockprotocol.org, visited on Dec. 28, 2022.

"Browser support for JavaScript APIs", https://developer.mozilla.org/en-US/docs/Mozilla/Add-ons/WebExtensions/Browser_support_for_JavaScript_APIs. Visited on Dec. 28, 2022.

"Chrome Extensions Reference", https://developer.chrome.com/docs/extensions/reference. Visited on Dec. 28, 2022.

"Comake SKL Demo for Delta", https://youtu.be/m_KsDWW84VU?t=177. Visited on Dec. 28, 2022.

"Data modeling for modern data warehouses", https://www.activityschema.com. Visited on Dec. 28, 2022.

"Design Tokens Format Module", https://tr.designtokens.org/format, Dec. 13, 2022.

"Dolt—It's Git for Data", DoltHub, 10 pages. Visited on Mar. 25, 2021.

"Events", https://developer.nylas.com/docs/api/#tag--Events. Visited on Dec. 28, 2022.

"HoloLens 2 AR Headset: On Stage Live Demonstration", UploadVR, Feb. 24, 2019, https://youtu.be/ulHPPtPBgHk?t=106 , 3 pages.

"Mem", https://get.mem.ai. Visited on Dec. 28, 2022.

"OpenAPI Generator", https://openapi-generator.tech. Visited on Dec. 28, 2022.

"Patient", https://www.flexpa.com/docs/fhir-resources/patient. Visited on Dec. 28, 2022.

"Protege", https://protege.stanford.edu. Visited on Dec. 28, 2022.

"Superface", https://superface.ai. Visited on Dec. 28, 2022.

"Theneo wins PITCH contest at Web Summit 2022", M.Taylor, Nov. 4, 2022, https://websummit.com/blog/theneo-pitch-2022-siemens.

"Unabomber Manifesto", Wikipedia, Mar. 23, 2021, 7 pages.

"Wasting time and energy trying to stay organized? We can help" Journal- Bring your projects to life, 6 pages. Visited on Mar. 26, 2021.

"Welcome to DoltHub", DoltHub Home | DoltHub, 1 page. Visited on Mar. 26, 2021.

8.1.15 Resource Patient—Detailed Descriptions, https://build.fhir.org/patient-definitions.html. Visited on Dec. 28, 2022.

Cruz et al., Using a Layered Approach for Interoperability on the Semantic Web, Proceedings of the Fourth International Conference on Web Information Systems Engineering Dec. 12-12, 2003 (WISE'03) 0-7695-1999-7/03.

Gates B., "Why do we believe lies?" Bill Gates and Rashida Jones Ask Big Questions—Episode 3, Nov. 30, 2020, 1 page.

Hall S., "Dolt, a Relational Database with Git-Like Cloning Features", Aug. 19, 2020, 15 pages.

http://example.com/idlab/function/getMIMEType, visited on Dec. 28, 2022.

https://airbyte.com, visited on Mar. 21, 2023.

https://metaphacts.com/, visited on Mar. 21, 2023.

https://supabase.com/blog/postgres-foreign-data-wrappers-rust, visited on Mar. 21, 2023.

https://virtuoso.openlinksw.com/, visited on Mar. 21, 2023.

https://web.archive.org/web/20220117015712/https:/hash.ai, visited on Dec. 28, 2022.

https://www.adept.ai/, visited on Mar. 21, 2023.

https://www.apollographql.com/, visited on Mar. 22, 2023.

https://www.fivetran.com, visited on Mar. 21, 2023.

https://www.marklogic.com, visited on Mar. 22, 2023.

(56)    References Cited

OTHER PUBLICATIONS https://www.raycast.com/, visited on Mar. 21, 2023.
https://www.starburst.io/, visited on Mar. 21, 2023.
https://www.withbroadcast.com/, visited on Mar. 21, 2023.
International Search Report and Written Opinion on PCT App. PCT/US2022/053994 dated Apr. 7, 2023 (14 pages).
International Search Report on PCT Appl. Ser. No. PCT/US2022/022341 dated Jul. 7, 2022 (8 pages).
Matney L., "Facebook debuts Infinite Office, a virtual reality office space" , Sep. 16, 2020, 8 pages.
Merge SDKs, https://docs.merge.dev/sdk. Visited on Dec. 28, 2022.
Metriport, https://github.com/metriport/metriport/tree/master/api/app/src/mappings. Visited on Dec. 28, 2022.
Storage Files, https://developers.kloudless.com/docs/latest/storage#files. Visited on Dec. 28, 2022.
Swagger Codegen, https://swagger.io/tools/swagger-codegen. Visited on Dec. 28, 2022.
Thacker N., "Microsoft Mesh—A Technical Overview" Mar. 2, 2021, 8 pages.
The Employee object, https://docs.merge.dev/hris/employees. Visited on Dec. 28, 2022.
The Lead object, https://docs.merge.dev/crm/leads/#leads-object. Visited on Dec. 28, 2022.
Universal API for Healthcare Data,https://metriport.com/. Visited on Dec. 28, 2022.
International Preliminary Report on Patentability and Written Opinion on International Application No. PCT/US2022/053994 dated Jun. 20, 2024 (7 pages).
PCT International Search Report and Written Opinion for Application No. PCT/US2025/025922 mailing date Jul. 10, 2025, 13 pages.
Extended European Search Report on EPO Application No. 22782019.8 dated Feb. 5, 2025 (10 pages).
International Search Report and Written Opinion on International Application No. PCT/US 24/43652 dated Nov. 6, 2024 (13 pages).
A Framework for Cooperative Ontology Construction Based on Dependency Management of Modules—CiteSeerX, accessed Apr. 9, 2025, https://citeseerx.ist.psu.edu/document?repid=rep1&type=pdf&doi=6a313da7cf5ec8d4d900e953bd291979a7394e84.
A Large-scale Investigation of Semantically Incompatible APIs behind Compatibility Issues in Android Apps—arXiv, accessed Apr. 9, 2025, https://arxiv.org/html/2406.17431v1.
A Model-Driven Method for automatic generation of Rule-based Web Applications—CEUR-WS.org, accessed Apr. 9, 2025, https://ceur-ws.org/Vol-486/kese2009-02.pdf.
A new paradigm for Continuous Alignment of Business and IT: Combining Enterprise Architecture Modeling and Enterprise Ontology, Repository.up.ac.za, accessed Apr. 9, 2025, https://repository.up.ac.za/bitstream/2263/50927/1/Hinkelmann_New_2016.pdf.
AA'01 Tutorial on Agent Communication Languages—UMBC CSEE, accessed Apr. 9, 2025, https://www.csee.umbc.edu/~finin/talks/691m.pdf.
Agent Certification Standards and Federated Meta-Orchestration: Building Reliable and Scalable AI Systems—Ve3 Global, Dec. 30, 2024, accessed Apr. 9, 2025, https://www.ve3.global/agent-certification-standards-and-federated-meta-orchestration-building-reliable-and-scalable-ai-systems/.
Agent Communications Language—Wikipedia, accessed Apr. 9, 2025, https://en.wikipedia.org/wiki/Agent_Communications_Language.
Agentic Workflows: Everything You Need to Know—Automation Anywhere, accessed Apr. 9, 2025, https://www.automationanywhere.com/rpa/agentic-workflows.
AI-Generated Infrastructure-as-Code: The Good, the Bad and the Ugly, Paul Foryt, published Feb. 2, 2023, accessed Apr. 9, 2025, https://www.styra.com/blog/ai-generated-infrastructure-as-code-the-good-the-bad-and-the-ugly/.
Alenezi, M., & Akour, M. (2025). AI-Driven Innovations in Software Engineering: A Review of Current Practices and Future Directions. Applied Sciences, 15(3), 1344., accessed Apr. 9, 2025, https://www.mdpi.com/2076-3417/15/3/1344.

Ali, A., Tufail, A., De Silva, L. C., & Abas, P. E. (2024). Innovating Patent Retrieval: A Comprehensive Review of Techniques, Trends, and Challenges in Prior Art Searches. Applied System Innovation, 7(5), 91., accessed Apr. 9, 2025, https://www.mdpi.com/2571-5577/7/5/91.
Alsaeh, Amal & Sezen, Arda. (2024). Semantic Interoperability and Reusability in IoT: a Systematic Mapping Study. 1-7. 10.1109/IDAP64064.2024.10710911.
Automated Database Schema Evolution in Microservice, André, ceur-ws.org, accessed Apr. 9, 2025, https://ceur-ws.org/Vol-3452/paper10.pdf.
Baldwin, Donald & Perjons, Erik. (2015), A Domain Neutral Enterprise Architecture Framework for Enterprise Application Integration and Pervasive Platform Services., accessed Apr. 9, 2025, https://www.researchgate.net/publication/321596806_A_Domain_Neutral_Enterprise_Architecture_Framework_for_Enterprise_Application_Integration_and_Pervasive_Platform_Services.
Categories of Ontologies' Applications in the Realm of Enterprise Modeling, Monika Kaczmarek, 2015 IEEE 17th Conference on Business Informatics, published Jul. 13, 2015, https://ieeexplore.ieee.org/abstract/document/7264721.
Challenges and solutions for distributed data management—. NET | Microsoft Learn, accessed Apr. 9, 2025, https://learn.microsoft.com/en-us/dotnet/architecture/microservices/architect-microservice-container-applications/distributed-data-management.
Code Generation—How Agentic Workflows Transform Requirements into Code, K G Aravinda Kumar, Feb. 9, 2025, accessed Apr. 9, 2025, https://aravindakumar.medium.com/code-generation-how-agentic-workflows-transform-requirements-into-code-61aecd683cbb.
Common Information Model (CIM) Infrastructure—DMTF, accessed Apr. 9, 2025, https://www.dmtf.org/sites/default/files/standards/documents/DSP0004_2.5.pdf.
Comparing Agent Communication Languages and Protocols: Choosing the Right Framework for Multi-Agent Systems—SmythOS, accessed Apr. 9, 2025, https://smythos.com/ai-agents/ai-agent-development/agent-communication-languages-and-protocols-comparison/.
Critical Schema Compatibility: The Key to Preventing Data Disasters, accessed Apr. 9, 2025, https://blog.devops.dev/critical-schema-compatibility-the-key-to-preventing-data-disasters-5ac8044d0643.
Data mesh—Wikipedia, accessed Apr. 9, 2025, https://en.wikipedia.org/wiki/Data_mesh.
Data Mesh Principles (Four Pillars) Guide for 2025—Atlan, accessed Apr. 9, 2025, https://atlan.com/data-mesh-principles/.
Data Mesh: Delivering Data-Driven Value at Scale: Dehghani, Zhamak—Amazon.com, accessed Apr. 9, 2025, https://www.amazon.com/Data-Mesh-Delivering-Data-Driven-Value/dp/1492092398.
Distributed Construction of Ontologies Using Hozo—CEUR-WS, accessed Apr. 9, 2025, https://ceur-ws.org/Vol-273/paper_19.pdf.
Djuric, Dragan & Gasevic, Dragan & Devedzic, Vladan. (2006). The Tao of Modeling Spaces. Journal of Object Technology. 5. 125-147. 10.5381/jot.2006.5.8.a4, accessed Apr. 9, 2025, https://www.researchgate.net/publication/220299599_The_Tao_of_Modeling_Spaces.
Elevate Data Mesh with Kyvos Semantic Layer, accessed Apr. 9, 2025, https://www.kyvosinsights.com/data-mesh/.
Enterprise Collaboration Architecture (ECA) Specification—Object Management Group, accessed Apr. 9, 2025, https://www.omg.org/spec/EDOC/1.0/PDF.
Extensible and Dynamic Topic Types for DDS—Object Management Group, Feb. 2012, accessed Apr. 9, 2025, https://www.omg.org/spec/DDS-XTypes/1.0/Beta2/PDF.
Federal Enterprise Architecture Framework—Obama White House, accessed Apr. 9, 2025, https://obamawhitehouse.archives.gov/sites/default/files/omb/assets/egov_docs/fea_v2.pdf.
Health informatics—Interoperability and Integration Reference Architecture—Model and Framework—HL7—Confluence, accessed Apr. 9, 2025, https://confluence.hl7.org/download/attachments/86967864/ISO-DIS%2023903%20-%20Interoperability%20Reference%20Architecture_Final_without%20Figure%20E1.pdf?version=1&modificationDate=1591980934242&api=v2.

(56)  References Cited

OTHER PUBLICATIONS

Introducing Ontology Evolution Management—SEDICI, accessed Apr. 9, 2025, http://sedici.unip.edu.ar/bitstream/handle/10915/21301/Documento_completo.pdf?sequence=1&isAllowed=y.

Lee, Juhyun & Park, Sangsung & Lee, Junseok. (2022). A Fast and Scalable Algorithm for Prior Art Search. IEEE Access. pp. 1-1. 10.1109/ACCESS.2022.3141494., accessed Apr. 9, 2025, https://www.researchgate.net/publication/357663630_A_Fast_and_Scalable_Algorithm_for_Prior_Art Search.

Linkerd vs. Istio: 7 Key Differences—Solo.io, accessed Apr. 9, 2025, https://www.solo.io/topics/linkerd/linkerd-vs-istio.

Louhichi, Soumaya & Graiet, Mohamed & Kmimech, Mourad & Bhiri, Mohamed & Gaaloul, Walid & Cariou, Eric. (2011). ATL Transformation for the Generation of SCA Model. 164-167. 10.1109/SKG.2011.37., accessed Apr. 9, 2025, https://www.researchgate.net/publication/221510895_ATL_Transformation_for_the_Generation_of_SCA_Model.

Matchmaker: Self-Improving Large Language Model Programs for Schema Matching, University of Cambridge, published Oct. 31, 2024, https://arxiv.org/abs/2410.24105.

Meta Object Facility | Enterprise Architect User Guide—Sparx Systems, accessed Apr. 9, 2025, https://sparxsystems.com/enterprise_architect_user_guide/17.0/modeling_languages/mof.html.

Mining Android API Usage to Generate Unit Test Cases for Pinpointing Compatibility Issues—arXiv, accessed Apr. 9, 2025, https://arxiv.org/pdf/2208.13417.

Mining Android API Usage to Generate Unit Test Cases for Pinpointing Compatibility Issues—Yanjie Zhao, accessed Apr. 9, 2025, https://yanjiezhao96.github.io/files/sun2022mining.pdf.

Model-Driven Development of AI for Digital Games—bac-lac.gc. ca, accessed Apr. 9, 2025, https://dam-oclc.bac-lac.gc.ca/download?is_thesis=1&oclc_number=922582798&id=2c06f462-9b58-4c7a-91c4-4fac9e31fc2c&fileName=vh53wz77q.pdf.

Model-driven Software Development, accessed Apr. 9, 2025, https://profs.info.uaic.ro/adrian.iftene/Licenta/Documentatie/2_Model-driven%20software%20developm%20-%20Sami%20Beydeda%20&%20Matthias%20Book%20&_317.pdf.

MOF 2.0/XMI Mapping Specification, v2.1—Object Management Group, Sep. 2005, accessed Apr. 9, 2025, https://www.omg.org/spec/XMI/2.1/PDF.

NextGRID Architectural Concepts—SciSpace, accessed Apr. 9, 2025, https://scispace.com/pdf/nextgrid-architectural-concepts-143ws4ctcz.pdf.

OGC Testbed-14: Characterization of RDF Application Profiles for Simple Linked Data Application and Complex Analytic Application, published Feb. 4, 2019, accessed Apr. 9, 2025, https://docs.ogc.org/per/18-094r1.pdf.

OMG Meta Object Facility (MOF) Core Specification, Oct. 2019, accessed Apr. 9, 2025, https://www.omg.org/spec/MOF/2.5.1/PDF.

Ontology-based multi-agent system to support business users and management—arXiv, accessed Apr. 9, 2025, https://arxiv.org/pdf/1807.03646.

Ontology-Driven Generation of Guidelines for Content Creation Purposes—IGI Global, accessed Apr. 9, 2025, https://www.igi-global.com/chapter/ontology-driven-generation-of-guidelines-for-content-creation-purposes/113127.

Palma et al., "Ontology Evolution," Ontology Engineering in a Networked World, Chapter 11, Jan. 2011, pp. 235-255.

Principles of data mesh | dbt Labs, Daniel Poppy, published Sep. 12, 2023, accessed Apr. 9, 2025, https://www.getdbt.com/blog/what-are-the-four-principles-of-data-mesh.

Representation of levels and instantiation in a metamodelling environment—Scientific Figure on ResearchGate. Available from: https://www.researchgate.net/figure/The-four-layer-metamodel-architecture_fig1_228569882 [accessed Apr. 22, 2025].

Requirements for enterprise-referencing architectures and methodologies BS ISO 15704:2019—BSI Standards Publication, accessed Apr. 9, 2025, https://webstore.ansi.org/preview-pages/BSI/preview_30360657.pdf.

S. D. J. McArthur; E. M. Davidson; V. M. Catterson; A. L. Dimeas; N. D. Hatziargyriou; F. Ponci; T. Funabashi, "Multi-Agent Systems for Power Engineering Applications-Part I: Concepts, Approaches, and Technical Challenges", IEEE Transactions on Power Systems, vol. 22, No. 4, Nov. 2007, accessed Apr. 9, 2025, https://site.ieee.org/pes-mas/agent-technology/standards-and-interoperability/.

Salatge et al., "Fault Tolerance Connectors for Unreliable Web Services," 37th Annual IEEE/IFIP International Conference on Dependable Systems and Networks (DSN'07), Jun. 2007, 10 pages.

Saraiva, João & Silva, Alberto. (2008). Evaluation of MDE Tools from a Metamodeling Perspective. Journal of Database Management. 19. 21-46. 10.4018/jdm.2008100102, accessed Apr. 9, 2025, https://www.researchgate.net/figure/An-example-of-OMGs-four-layer-metamodel-architecture_fig2_220373664.

Sascha Welten, Laurenz Neumann, Yeliz Ucer Yediel, Luiz Olavo Bonino da Silva Santos, Stefan Decker, Oya Beyan; Dams: A Distributed Analytics Metadata Schema. Data Intelligence 2021; 3 (4):528-547., accessed Apr. 9, 2025, https://direct.mit.edu/dint/article/3/4/528/101036/DAMS-A-Distributed-Analytics-Metadata-Schema.

Security and Microservice Architecture on AWS: Architecting and Implementing a Secured, Scalable Solution [1 ed.] 1098101464, 9781098101466—DOKUMEN.PUB, accessed Apr. 9, 2025, https://dokumen.pub/security-and-microservice-architecture-on-aws-architecting-and-implementing-a-secured-scalable-solution-1nbsped-1098101464-9781098101466-i-4320235.html.

Semantic Data Mesh for Scalable Data Management | Timbr.ai, Tzvi Weitzner, accessed Apr. 9, 2025, https://timbr.ai/blog/semantic-data-mesh-for-scalable-data-management/.

Semantic Interoperability Methods for Smart Service Systems: A Survey—Uni Mannheim, accessed Apr. 9, 2025, https://www.uni-mannheim.de/media/Einrichtungen/ines/Preprints/tems-online.pdf.

Semantic service discovery in the service ecosystem | QUT ePrints, accessed Apr. 9, 2025, https://eprints.qut.edu.au/50872/.

Service Mesh in Kubernetes: A Comparison of Istio and Linkerd | by Yasinkartal | Medium, accessed Apr. 9, 2025, https://medium.com/@yasinkartal2009/service-mesh-in-kubernetes-istio-and-linkerd-f4865a9bcc86.

Service Meshes Decoded: Istio vs Linkerd vs Cilium | LiveWyer, Oleksandr, published May 8, 2024, accessed Apr. 9, 2025, https://livewyer.io/blog/service-meshes-decoded-istio-vs-linkerd-vs-cilium/.

Service Meshes: Istio and Linkerd for Advanced Traffic Management | by Platform Engineers, accessed Apr. 9, 2025, https://medium.com/@platform.engineers/service-meshes-istio-and-linkerd- for-advanced-traffic-management-8f6150e575d8.

Slides: How a Semantic Layer Makes Data Mesh Work At Scale—DATAVERSITY, accessed Apr. 9, 2025, https://www.dataversity.net/slides-how-a-semantic-layer-makes-data-mesh-work-at-scale/.

Source code generation using deep learning: revolutionizing software development, accessed Apr. 9, 2025, https://www.byteplus.com/en/topic/419556.

Stojanovic, Ljiljana & Maedche, Alexander & Motik, Boris & Stojanovic, Nenad. (2002). User-Driven Ontology Evolution Management. Proc of the 13th Intl Conf On Knowledge Engineering and Knowledge Management. 10.1007/3-540-45810-7_27., accessed Apr. 9, 2025, https://www.researchgate.net/publication/200827810_User-Driven_Ontology Evolution_Management.

Sun, et al., "Mining Android API Usage to Generate Unit Test Cases for Pinpointing Compatibility Issues," accessed Apr. 23, 2025, https://arxiv.org/pdf/2208.13417, 13 pages (2022).

The Essence of Multilevel Metamodeling—School of Engineering and Computer Science Wiki, accessed Apr. 9, 2025, https://homepages.ecs.vuw.ac.nz/~tk/publications/papers/essence.pdf.

The Principles of Data Mesh and the Semantic Layer—AtScale, Elif Tutuk, accessed Apr. 9, 2025, https://www.atscale.com/resource/data-mesh-principles-semantic-layer/.

Thiagarajan et al., "Semantic Service Discovery by Consistency-Based Matchmaking," Lecture Notes in Computer Science (LNCS) 5446, pp. 492-505, 2009.

(56)    References Cited

OTHER PUBLICATIONS

Tools for Developing Applications in the Semantic Web of Things: A Systematic Literature Review | Revista Facultad de Ingenieria, accessed Apr. 9, 2025, https://revistas.uptc.edu.co/index.php/ingenieria/article/view/17959/14943.

Types of Agent Communication Languages—SmythOS, accessed Apr. 9, 2025, https://smythos.com/ai-agents/ai-agent-development/types-of-agent-communication-languages/.

UBL NDR Version 1pt0—OASIS Open, accessed Apr. 9, 2025, https://docs.oasis-open.org/ubl/prd-UBL-NDR-2.0.htm.

Understanding Data Mesh Principles—DATAVERSITY, accessed Apr. 9, 2025, https://www.dataversity.net/understanding-data-mesh-principles/.

Wang, Hongwei & Wang, Guoxin & Jinzhi, Lu & Ma, Changfeng. (2019). Ontology Supporting Model-Based Systems Engineering Based on a GOPPRR Approach. 10.1007/978-3-030-16181-1_40, accessed Apr. 9, 2025, https://www.researchgate.net/publication/332025938_Ontology_Supporting_Model-Based_Systems_Engineering_Based_on_a_GOPPRR_Approach.

Weaving the Extensible Bills of Materials (xBOM) Fabric, Erica Dretzka, Brent Smith, Nathaniel Fuller, MODSIM World 2023, published May 22, 2023, http://modsimworld.org/about/publications/2023.

What are Agentic Workflows? | IBM, Cole Stryker and Anna Gutowska, Mar. 7, 2025, accessed Apr. 9, 2025, https://www.ibm.com/think/topics/agentic-workflows.

"What Are Agentic Workflows?", Mansi Shah, Feb. 27, 2025, accessed Apr. 9, 2025, https://arya.ai/blog/agentic-workflows.

What is a Semantic Layer? (Components and Enterprise Applications), Lulit Tesfaye, Feb. 1, 2024, accessed Apr. 9, 2025, https://enterprise-knowledge.com/what-is-a-semantic-layer-components-and-enterprise-applications/.

What Is Service Mesh in Kubernetes & 4 Tools to Get Started, accessed Apr. 9, 2025, https://www.tigera.io/learn/guides/service-mesh/service-mesh-kubernetes/.

Rose et al., "Zero Trust Architecture," NIST Special Publication 800-207, Aug. 2020, 59 pages.

* cited by examiner

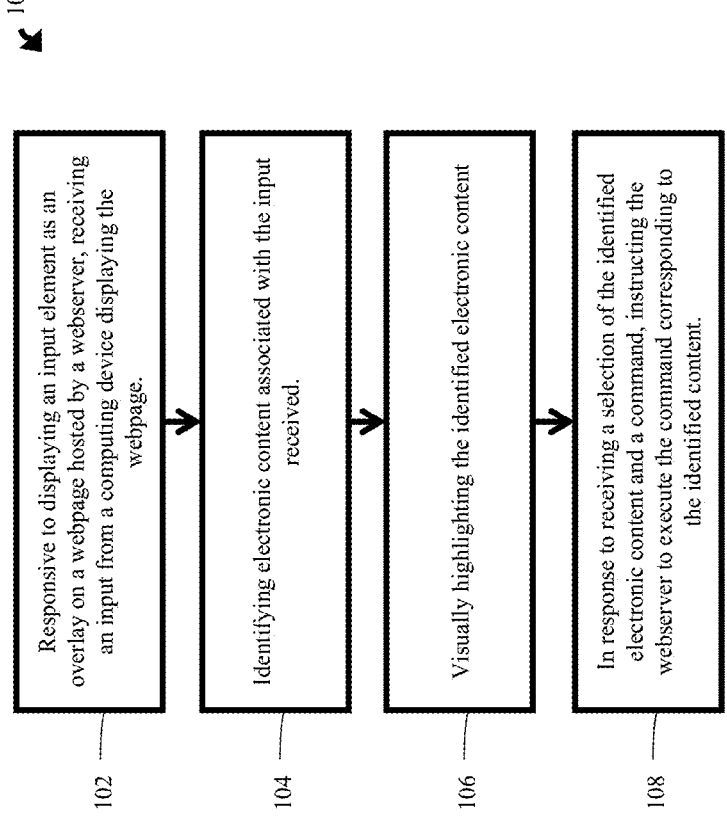

Responsive to displaying an input element as an overlay on a webpage hosted by a webserver, receiving an input from a computing device displaying the webpage.

Identifying electronic content associated with the input received.

Visually highlighting the identified electronic content

In response to receiving a selection of the identified electronic content and a command, instructing the webserver to execute the command corresponding to the identified content.

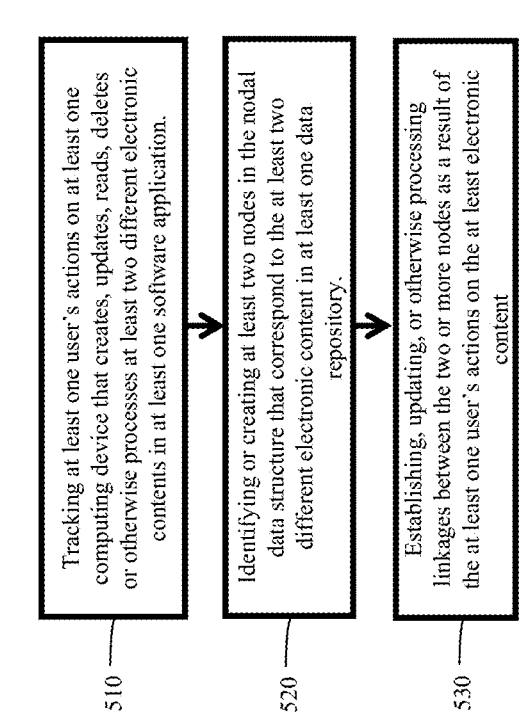

500

Tracking at least one user's actions on at least one computing device that creates, updates, reads, deletes or otherwise processes at least two different electronic contents in at least one software application.

510

Identifying or creating at least two nodes in the nodal data structure that correspond to the at least two different electronic content in at least one data repository.

520

Establishing, updating, or otherwise processing linkages between the two or more nodes as a result of the at least one user's actions on the at least electronic content

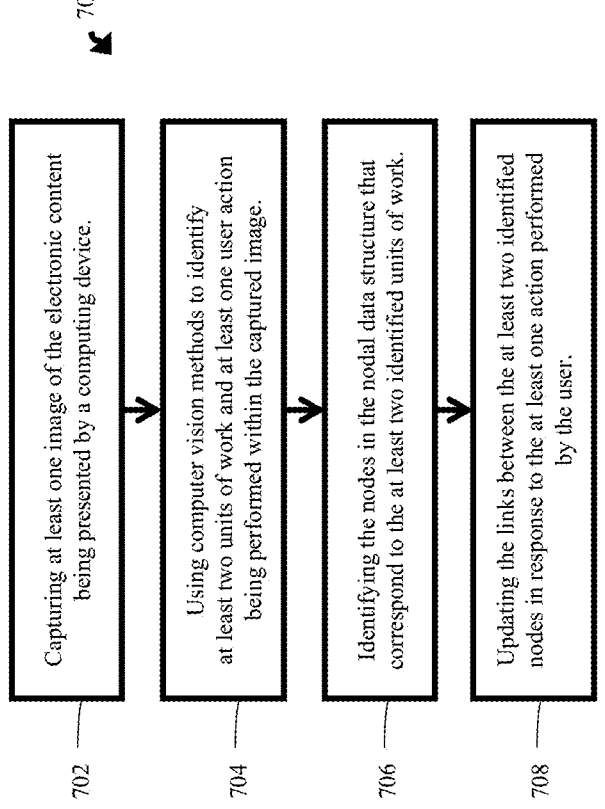

700

702 — Capturing at least one image of the electronic content being presented by a computing device.

704 — Using computer vision methods to identify at least two units of work and at least one user action being performed within the captured image.

706 — Identifying the nodes in the nodal data structure that correspond to the at least two identified units of work.

708 — Updating the links between the at least two identified nodes in response to the at least one action performed by the user.

Trigger
1010

When recruiting@company.com gets a new email
with an attached resume

Action
1020

Copy the attachment from Gmail to Box

Action
1030

Create a series of task in Asana to review the candidate
And assign them to colleague A

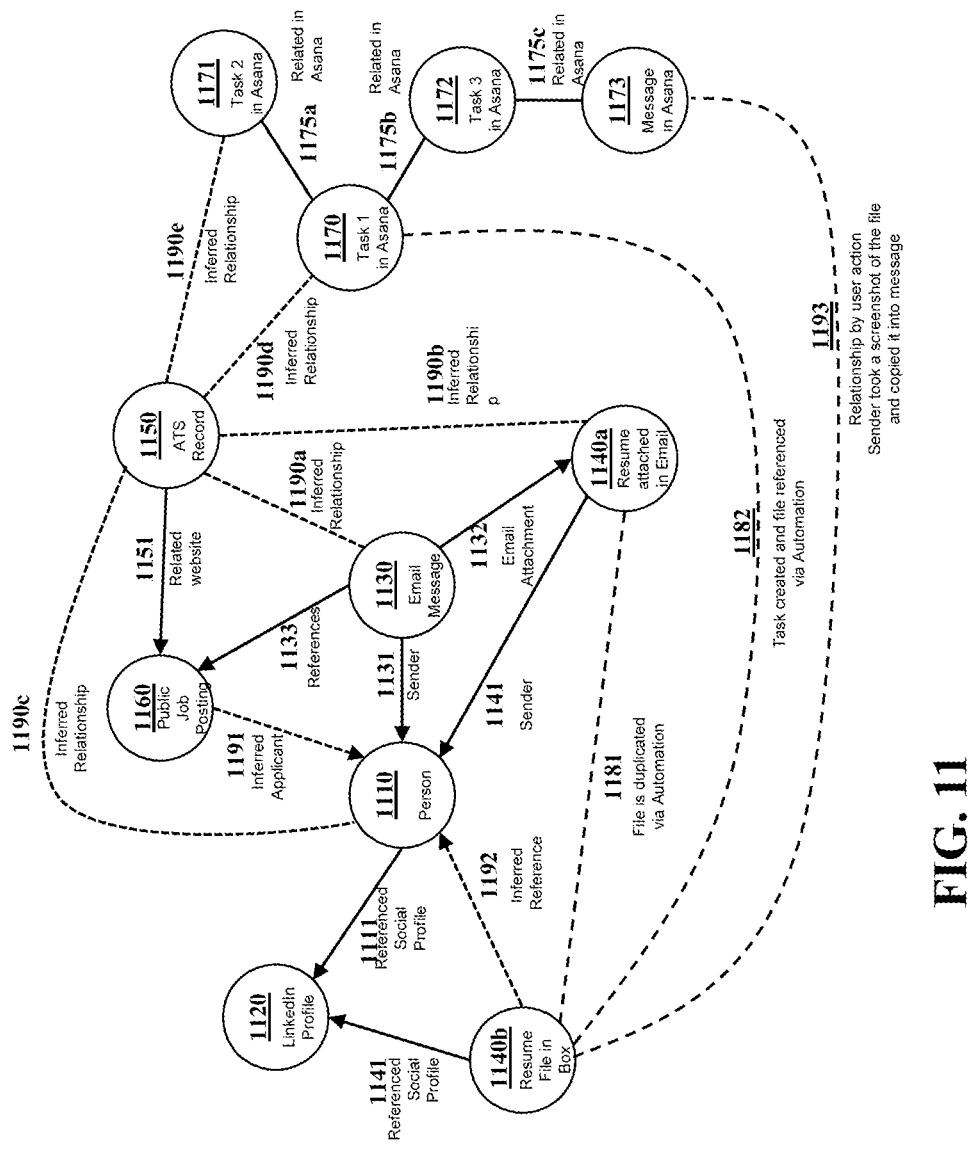
FIG. 11

Trigger 1201
When person C submits a new event to an online form

Action 1202
Add the event details as a new row in a specific spreadsheet

Action 1203
Send an email to colleague D to review the event

Trigger 1251
Whenever the specific spreadsheet is updated, check whether any new events are marked as "approved"

Action 1252
Add newly confirmed events to the website's database

1200

1250

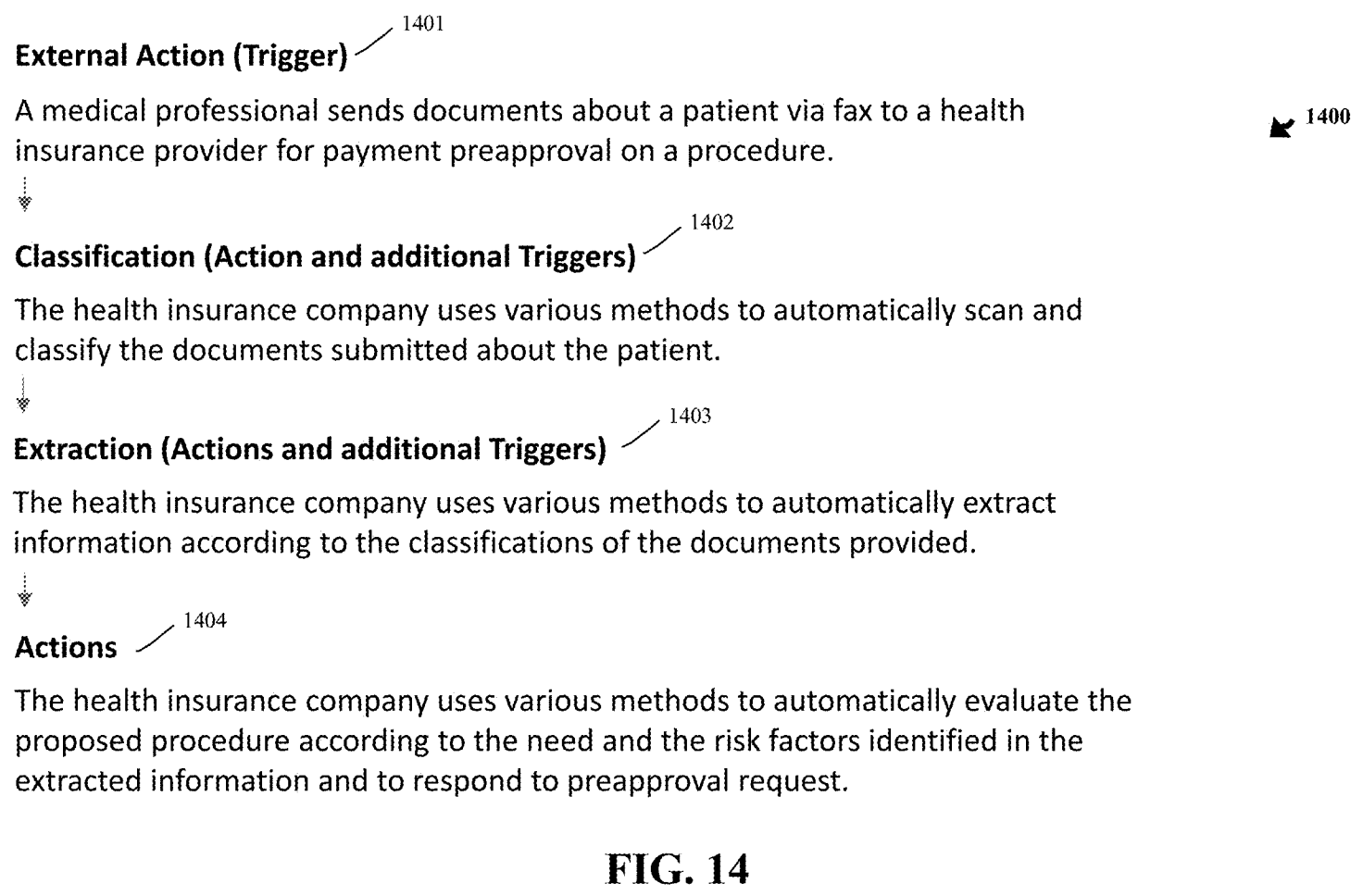

1400

External Action (Trigger) 1401

A medical professional sends documents about a patient via fax to a health insurance provider for payment preapproval on a procedure.

Classification (Action and additional Triggers) 1402

The health insurance company uses various methods to automatically scan and classify the documents submitted about the patient.

Extraction (Actions and additional Triggers) 1403

The health insurance company uses various methods to automatically extract information according to the classifications of the documents provided.

Actions 1404

The health insurance company uses various methods to automatically evaluate the proposed procedure according to the need and the risk factors identified in the extracted information and to respond to preapproval request.

FIG. 14

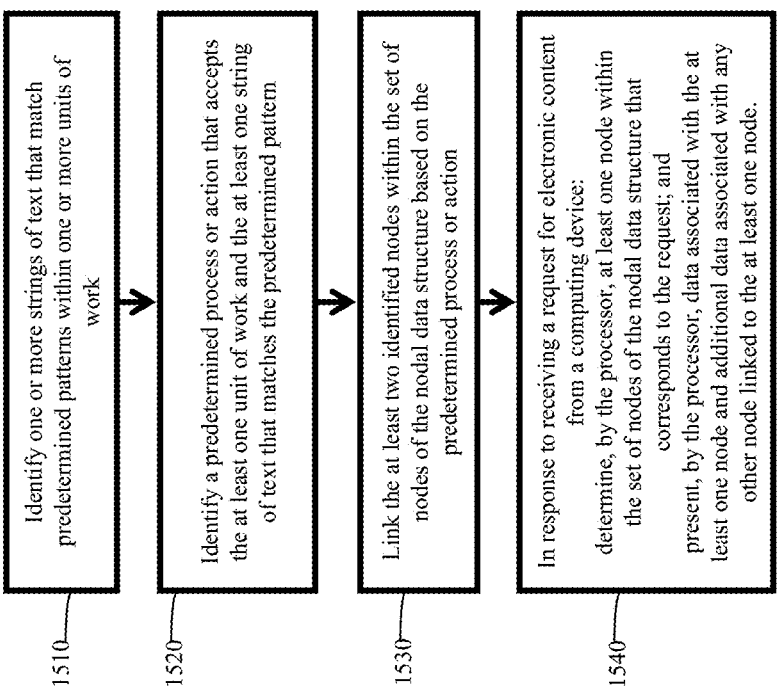

1510 — Identify one or more strings of text that match predetermined patterns within one or more units of work 1520 — Identify a predetermined process or action that accepts the at least one unit of work and the at least one string of text that matches the predetermined pattern 1530 — Link the at least two identified nodes within the set of nodes of the nodal data structure based on the predetermined process or action 1540 — In response to receiving a request for electronic content from a computing device:
determine, by the processor, at least one node within the set of nodes of the nodal data structure that corresponds to the request; and
present, by the processor, data associated with the at least one node and additional data associated with any other node linked to the at least one node.

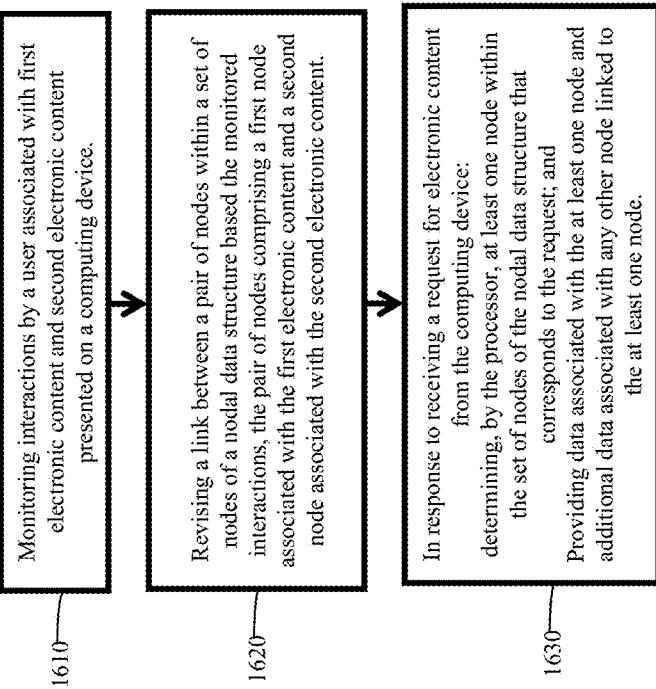

1610 — Monitoring interactions by a user associated with first electronic content and second electronic content presented on a computing device.

1620 — Revising a link between a pair of nodes within a set of nodes of a nodal data structure based the monitored interactions, the pair of nodes comprising a first node associated with the first electronic content and a second node associated with the second electronic content.

1630 — In response to receiving a request for electronic content from the computing device:
determining, by the processor, at least one node within the set of nodes of the nodal data structure that corresponds to the request; and
Providing data associated with the at least one node and additional data associated with any other node linked to the at least one node.

METHODS TO INFER CONTENT RELATIONSHIPS FROM USER ACTIONS AND SYSTEM AUTOMATIONS

CROSS REFERENCE TO RELATED APPLICATIONS

This application is a continuation-in-part of U.S. patent application Ser. No. 17/707,888, filed Mar. 29, 2022, which is incorporated herein by reference in its entirety for all purposes.

This application claims priority to U.S. Provisional Patent Application No. 63/255,401, filed Oct. 13, 2021, which is incorporated herein by reference in its entirety for all purposes.

FIELD OF DISCLOSURE

The present invention relates to data communication and, more particularly, to systems and methods for a collaborative platform.

BACKGROUND

As the processing power of computers allow for greater computer functionality and the internet technology era allows for interconnectivity between computing systems, electronic content have become more ubiquitous. Content providers use various platforms, such as websites or other applications, to provide their content.

However, since the implementation of more sophisticated online tools, several shortcomings in these technologies have been identified and have created a new set of impediments. For example, electronic content for a given user or organization now tends to be highly fragmented across a variety of different tools and systems. The high level of fragmentation makes it more difficult to monitor the electronic content consumed by users, to extract knowledge from the content consumed by users, and to augment electronic content with other useful knowledge.

SUMMARY

For the aforementioned reasons, there is a desire for an efficient system and method to identify, extract, and improve access to knowledge and capabilities across fragmented systems by analyzing electronic content that has been, is being, or will be consumed by users (e.g., is presented to users). More specifically, there is a growing need for methods and systems that facilitate how users interact with computer systems in order to, for example, enable users to easily identify relevant actions for and perform relevant actions on any given piece of data across a variety of systems and interfaces, and facilitate users' access to relevant knowledge for any given piece of data. Methods and systems described herein can monitor and help manage electronic content, actions, and relationships between and across data and actions.

The methods and systems described herein can be provided through independently built, managed, and/or distributed system and applications, as well as be integrated into existing features and/or windows presented by an operating system and/or application (e.g., provided by the analytics server) on a computer. For example, a user viewing a webpage associated with a given medication might be able to see related units of work and actions in a contextual panel on the side of the screen, including references to the medication across sources such as WebMD, the user's electronic health record, any indexed files and messages, etc. Similarly, the contextual side panel could show relevant information specific to the user such as whether the user has previously taken this specific medication, other similar medications, the doctors that prescribed them, the instructions for how the medication was prescribed to the user, common side effects, actions related to the medication such as refilling prescriptions and asking the prescribing doctor questions, etc.

Moreover, the methods and systems described herein can also be implemented, such that the analytics server can present context/relevant data associated with any given unit of work (e.g., chat message, email, file, mailing address, calendar event, event venue, movie, actor, script, purchase order, patient record, medication, etc.). For instance, instead of analyzing the content displayed (or otherwise outputted) by the user's computer, the analytics server may receive a selection of a unit of work from the user (e.g., the user may right-click on a file name or may otherwise select the file, a system might automatically send a selection of one or more products, etc.). In response, the analytics server may analyze the selected unit of work and display relevant data and actions as described herein. In some configurations, the user may launch a search interface with contextual data as an overlay/pop-up which will automatically use the electronic content as the selected unit(s) of work described above.

The user can easily interact (e.g., keyboard shortcut, icon click, voice command, API endpoint, etc.) with the electronic device to pull up searchable relevant context data and/or actions about the electronic content. When using the search feature, if no results are found to be directly associated with the electronic content, the analytics engine can recommend results from elsewhere in the nodal data structure and/or other sources. The analytics server may use the electronic content (and the various connections, and/or similar attributes such as specific fields or vectors, that it may have to units of work in nodal data structure) to influence the ranking of search results such that nodes that are related to both the search query and the electronic content are ranked higher than nodes with only an association to the search query.

In some configurations, the user may launch a search interface with contextual data as an overlay/pop-up which will automatically use a combination of the electronic content and information about the user, such as information about the user's role or intent, as the selected unit(s) of work described elsewhere herein (e.g., create or otherwise use vector representations of the selected unit or units of work to perform nearest neighbor searches). In this way, the user is able to easily interact (e.g., keyboard shortcut, icon click, voice command, etc.) with the electronic device to pull up searchable data that is relevant to the electronic content and to the user performing the search. When using the search feature, if no results are found to be directly associated with the electronic content, the analytics engine can recommend results from elsewhere in the nodal data structure. The analytics server may use the electronic content (and the various connections, and/or similar attributes such as specific fields or vectors, that it may have to units of work in nodal data structure) to influence the ranking of search results such that nodes that are related to both the search query, the electronic content, and specific associations with the user entering the query are ranked higher than nodes with only an association to the search query.

In a non-limiting embodiment, a method comprises monitoring, by a processor, interactions by a user associated with first electronic content and second electronic content presented on a computing device; linking, by a processor, a pair of nodes within a set of nodes of a nodal data structure based the monitored interactions, the pair of nodes comprising a first node associated with the first electronic content and a second node previously unlinked to the first node and corresponding to the second electronic content; revising, by a processor, a link between a pair of nodes within a set of nodes of a nodal data structure based the monitored interactions, the pair of nodes comprising a first node associated with the first electronic content and a second node associated with the second electronic content; in response to receiving a request for electronic content from the computing device: determining, by the processor, at least one node within the set of nodes of the nodal data structure that corresponds to the request; and providing, by the processor, data associated with the at least one node and additional data associated with any other node linked to the at least one node.

In another embodiment, a system comprises a non-transitory computer-readable medium having a set of instructions, that when executed, cause a processor to: monitor interactions by a user associated with first electronic content and second electronic content presented on a computing device; revising, by a processor, a link between a pair of nodes within a set of nodes of a nodal data structure based the monitored interactions, the pair of nodes comprising a first node associated with the first electronic content and a second node associated with the second electronic content; in response to receiving a request for electronic content from the computing device: determine at least one node within the set of nodes of the nodal data structure that corresponds to the request; and provide data associated with the at least one node and additional data associated with any other node linked to the at least one node.

In another embodiment, a system comprises a computing device configured to output a first electronic content and a second electronic content; and a server in communication with the computing device, the server configured to monitor interactions by a user associated with first electronic content and second electronic content presented on the computing device; revising, by a processor, a link between a pair of nodes within a set of nodes of a nodal data structure based the monitored interactions, the pair of nodes comprising a first node associated with the first electronic content and a second node associated with the second electronic content; in response to receiving a request for electronic content from the computing device: determine at least one node within the set of nodes of the nodal data structure that corresponds to the request; and provide data associated with the at least one node and additional data associated with any other node linked to the at least one node.

BRIEF DESCRIPTION OF THE DRAWINGS

Certain aspects of the present invention are depicted in the accompanying drawings, which are intended to be considered in conjunction with the detailed description below, and which are intended to be illustrative rather than limiting, and, in which:

FIG. 1 illustrates operational steps of a method for inferring content relationships, according to an embodiment.

FIG. 5 illustrates operational steps of a method for inferring content relationships, according to an embodiment.

FIGS. 7-9 illustrate operational steps of methods for inferring content relationships, according to various embodiments.

FIG. 11 illustrates a nodal data structure, according to an embodiment that corresponds with the automated workflow in FIG. 10.

FIG. 14 illustrates operational steps for an intelligently automated workflow over data regardless of source applications, according to an embodiment.

FIG. 15 illustrates operational steps of a method for triggering automations and inferring content relationships, according to an embodiment.

FIG. 16 illustrates operational steps of a method for inferring content relationships, according to an embodiment.

DETAILED DESCRIPTION

While various aspects and embodiments have been disclosed, other aspects and embodiments are contemplated. The various aspects and embodiments disclosed are for purposes of illustration and are not intended to be limiting, with the true scope and spirit being indicated by the following claims.

FIG. 1 displays a method executed by the analytics server that allows a user to search and/or navigate electronic content displayed on a computer. For instance, the analytics server may execute the method 100 to allow users to navigate a website using their keyboard and without needing to use any other input devices/elements, such as a mouse. The analytics server, as used herein, may include a browser extension, any code running on the user's computer (implemented by the analytics server or a third party), etc. This code and/or related configuration could also be semi-self-generating (e.g., as it learns from user behavior to do new types of searches and/or selections).

The method 100 may describe the analytics server acting on a "webpage hosted by a webserver." The webpage could also be hosted on the user's personal computer (e.g., local files opened in the browser with the file:// protocol). Moreover, the methods and systems described herein are not limited to webpages. They also apply to any electronic content (e.g., it could be an NSView in an iOS app, an Apple TV Markup Language document, WPF or XAML document for windows desktop applications, etc.).

These methods and systems also apply to speech input which gets translated into text then follows the same process as keyboard text input. They also apply to other forms of human-computer interaction devices such as cameras, haptic input devices, and brain scanning devices that allow the translation of user generated inputs into text commands and/or parameters.

At step 102, the analytics server may, receive an input from a computing device displaying a webpage responsive to displaying an input element as an overlay on the webpage hosted by a webserver.

5

Figure 2:
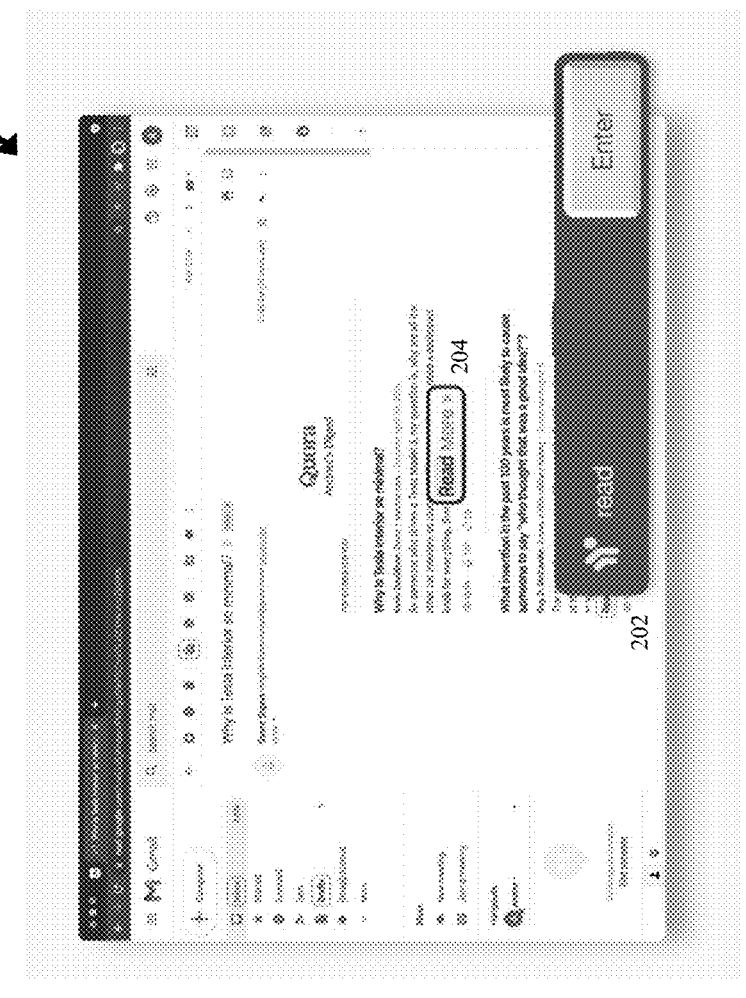
FIGS. 2-4 illustrate various graphical user interfaces, according to various embodiments.

Referring now to FIG. 2, a non-limiting example of a website and the overlay is provided. The analytics server may display a graphical element on the user's computer. The graphical element may be controlled by the analytics server through a browser extension. For instance, the user may download the browser extension and, as a result, the analytics server may display the graphical element on the user's computer. Alternatively, the computing device's operating system or the browser application may have the graphical element and analytics server included, thereby removing the need for an extension. Regardless of the exact configuration, the analytics server may display the graphical element as an overlay over the electronic content being displayed on the user's computer. The graphical element may include an input element, as depicted in the graphical element 202 displayed as an overlay to the webpage 200. The graphical element 202 may also include the "enter" button indicating that the user would like to proceed with searching for the inputted term. In other words, the primary command for the graphical element 202 is "enter" or "select." The graphical element 202 allows the user to input a desired term (e.g., "read" as depicted in FIG. 2).

Even though certain aspects of the present disclosure describe and depict a graphical element having an input element that is displayed throughout the process, in some configurations, the graphical element may be dormant and hidden from the user (e.g., operating as a background process). For instance, the graphical element may not be displayed, however, the analytics server may be monitoring the user's key stokes (or other input devices such as a microphone) to identify any input received from the user. In that way, the same services described herein (e.g., method 100) can be provided without obfuscating the user's view of the electronic content (e.g., webpage 200).

The input element is not limited to alphanumerical strings and characters inputted by the user using a keyboard. In alternative embodiments, the user may input the desired terms using audio input elements or other input elements, such as eye-controlled input elements, special keyboards, sip and puff (SNP) input devices, and the like.

In some embodiments, the user may use voice commands for their input. In those embodiments, the analytics server may utilize a voice recognition protocol to identify the voice command received from the user.

In some embodiments, the analytics server may use translation services to allow a user to input commands in one language and convert them into commands in the detected language used by the webpage and select results accordingly. This is particularly relevant for webpages or web browser which do not offer translation of the text on a webpage.

Referring back to FIG. 1, at step 104, the analytics server may identify electronic content associated with the input received. Using various methods and systems described herein, the analytics server may analyze the electronic content and determine one or more parts of the electronic content that correspond to the input received at step 102.

In a non-limiting example, when a user types in the input element provided by the analytics server (e.g., search bar on a webpage or the graphical user interface 202), the analytics server recursively scans through the webpage's document object model (DOM) node tree to find all DOM nodes which match the user's query. As used herein, the DOM is an interface that treats HTML or XML documents as a tree structure, where each DOM node is an object of the document. DOM also provides a set of methods to query the tree and/or alter the structure or style. Therefore, a DOM node is different than the nodes described in relation to the nodal data structure discussed herein.

Whether a DOM node matches the query or not may be determined by detecting if any text within the DOM node includes the user's query or if an attribute of the DOM node includes the user's query. The analytics server may use this method of scanning DOM node attributes hidden to the user to identify buttons and/or actions displayed on the webpage which, for example, only display an icon and no text (e.g., based on the buttons functionality rather than text displayed on the button or action). Not all attributes of a DOM node may be relevant to the user's query or relevant to be used by the analytics server executing the method 100. Thus, the analytics server may only search a specific list of attributes per DOM node based on its tag name. These tag data may be found in files associated with the webserver hosting the electronic content being displayed on the user's computer. For instance, the analytics server can analyze JSON files and execute corresponding code to analyze DOM nodes, such as the following:

```
{
    "A": ["title", "aria-label", "href"],
    "INPUT": ["name", "placeholder", "value", "aria-label"],
    "SELECT": ["name"],
    "TEXTAREA": ["name", "placeholder"],
    "BUTTON": ["name", "aria-label"],
    "DIV": ["title", "aria-label", "data-tooltip"],
    "SPAN": ["title", "aria-label", "data-tooltip"]
}
```

In addition to matching nodes against the user's exact query (e.g., input received in step 102), the analytics server may also match the input received against synonyms of the user's query, as well as other words and phrases with similar meaning. In this way, the user who has expressed their intention in a slightly different manner may still see results generated by the analytics server, even though the webpage may not include the exact term inputted by the user. For instance, a user may input "trash" where the user would like to "delete" a file and where the webpage uses the term "discard" to mean the same thing. In this way, the analytics server may identify the user's intention and identify the text "discard" within a DOM node or a DOM node's attributes.

The analytics server may use a precompiled synonym library or a word similarity algorithm (e.g., word2vec libraries, sentence2vec libraries). Alternatively, the analytics server may use one or more configuration files (generated by the analytics server or a third party) per URL host (e.g., webserver) with synonyms specific to that host. Effectively, each configuration file can be thought of as mapping to an "App" used in the browser (e.g., mail.google.com for Gmail, news.ycombinator.com for Hacker News). More specifically, the analytics server may choose from various configuration files related to a specific URL host, depending on what specific website the user is viewing. For example, the analytics service might use different configuration files when the user is viewing his email inbox, when he is reading an email, and when he is writing an email draft. In some embodiments, the specific configurations may be identified by the attributes of the webpage the user is viewing, such as attributes of the webpage's full URL, attributes of the webpage's header, or attributes of the webpage's page source (e.g., inside the head tags, using schema.org information).

Some embodiments may consider configuration files based on other criteria, such as the identification of a particular unit of work on the webpage or the identification of a certain type of functionality on the webpage, rather than only the URL host the webpage belongs to. For example, various email tools are likely to offer similar functionality and use similar terms. These various email tools may therefore also have a high likelihood of successfully sharing the same configuration file(s) across URL hosts. In this way, if a particular configuration file is missing for a URL host, then the analytics server might be able to rely on generic configuration files for "email" tools, or even configuration file(s) from other "email" tools with specific URL host data.

In some embodiments, the analytics server may ask the user to provide the missing information in order to best understand what types of actions are important. In other words, the analytics server may ask a user to provide a "word" or "description" and to correlate them with specific action(s) and/or interactions(s) that he would like the analytics server to simulate and/or provide via the graphical input 202. The user may, for example, provide the necessary configuration file(s), be guided through a no-code set-up wizard for a given webpage that relates an action with one or more words, and the like.

After finding all DOM nodes corresponding to (e.g., matching) the user's query, the analytics server may filter those nodes down to only those which are likely to be able to be selected or otherwise acted upon by the user. The analytics server may use various factors to identify this subset of the DOM nodes. The following is a non-limiting list of factors used to determine whether a DOM node that has been identified as corresponding to the user's query is able to be selected or otherwise acted upon:

If the DOM node's tag name specifies that it's a button, link, or input;

If any of the DOM node's attributes specifies that it's a button, link, or input; or If the DOM node matches an additional selector defined in the configuration file (e.g., under the additional_button_selectors config).

Using various scoring algorithms, the analytics server may score each of the matched buttons, links, and inputs (e.g., corresponding to the DOM nodes identified within the webpage), which will be selected. The analytics server may use these scores to determine which DOM node is the "best", or most relevant, matching DOM node that will be selected first. Of course the "best" matching DOM node is highly contextual based on several factors. For instance, a DOM node's score may be increased if:

the match was made through text on the screen vs. a hidden attribute of the node, the match was made through the user's exact query vs. a synonym, the match is visible on the screen to the user vs. not visible, any words in the match's fields start with the user's query vs. just including the query, any words in the match's fields are in the user's query and are in a list of "relevant words" in the configuration file, or The node matches one of the selectors in the list of "relevant selectors" in the configuration file.

Each of the above-described factors may have a related weight which determines how much it effects the DOM node's score.

Using the above-described methods and schemes, the analytics server may determine which identified DOM nodes is "better" than other identified DOM nodes.

At step 106, the analytics server may visually highlight the identified electronic content. Once the matching buttons, links, and inputs (corresponding to identified DOM nodes) are found and sorted according to their respective score, the analytics server may visually highlight the corresponding content on the electronic content displayed on the user's computer. For instance, the analytics server may add a selection box around each node and focus and automatically scroll to the one with the highest score. Referring now to FIG. 2, when the user enters "read," the analytics sever displays the box 204 around "read" displayed on the webpage 200.

In some embodiments, a user can then press the tab key (e.g., or any other pre-configured key) to move through the matches. For instance, if the analytics server has identified five instance of "read" within the webpage 200, the user may be able to navigate through all choices.

Additionally or alternatively, the analytics server may use the HTML structure to return results related to a given query that does not necessarily match the query's exact terms. For example, a group of related buttons that are contained in the same HTML element (e.g., a div or container), could be selected and toggled through by their association to each other, given that at least one of the results matches the query with some level of relevance. This type of selection could be provided through configuration for a given webpage type (e.g., by domain, by type, by some combination of multiple attributes, by a custom classifier, etc.)

Referring back to FIG. 1, at step 1008, the analytics server may, in response to receiving a selection of the identified electronic content and a command, instruct the web server to execute the command corresponding to the identified content.

The analytics server may receive a selection of the visually highlighted content and a corresponding command. As a result, the analytics server instructs the webserver to execute the command. For instance, and referring back to FIG. 2, the user can press the enter key to click or focus the selected button, link, or input (e.g., box 204). As a result, the analytics server activates the hyperlink depicted within the box 204 and directs the user to the corresponding new webpage.

Figure 3:
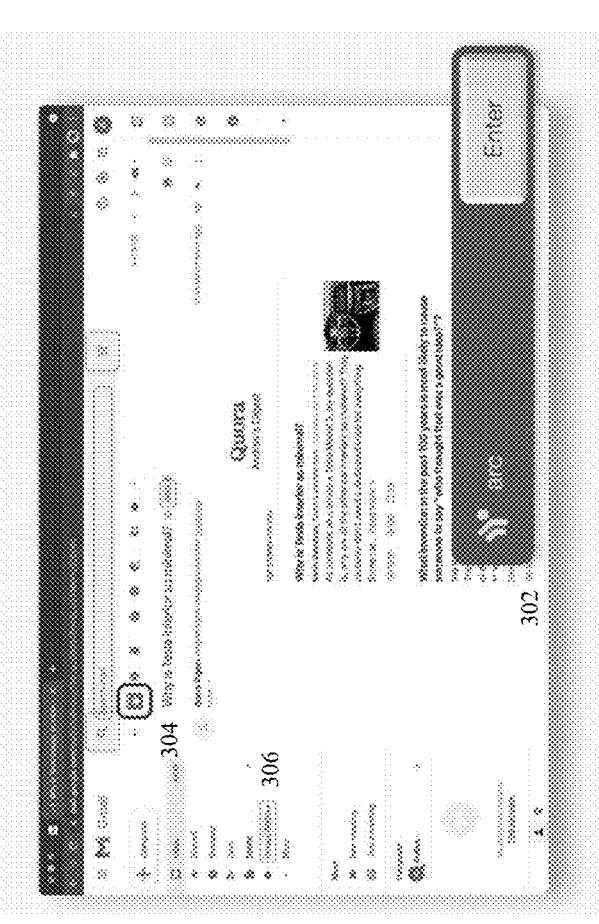

FIG. 3 depicts a second non-limiting example. In this embodiment, the analytics server displays the graphical element 302 as an overlay on the webpage 300 using a browser extension (not shown). When the user inputs "arc" (using the keyboard or by speaking "arc" into a microphone), the analytics server identifies two DOM nodes that correspond to the boxes 306 and 304. As depicted, the box 304 corresponds to a button and not the word archived as the box 306. When the user interact with the "enter" button of the graphical element 302, the analytics server instructs the web server to activate the archive button and archive the email displayed on the user's computer.

Figure 4:
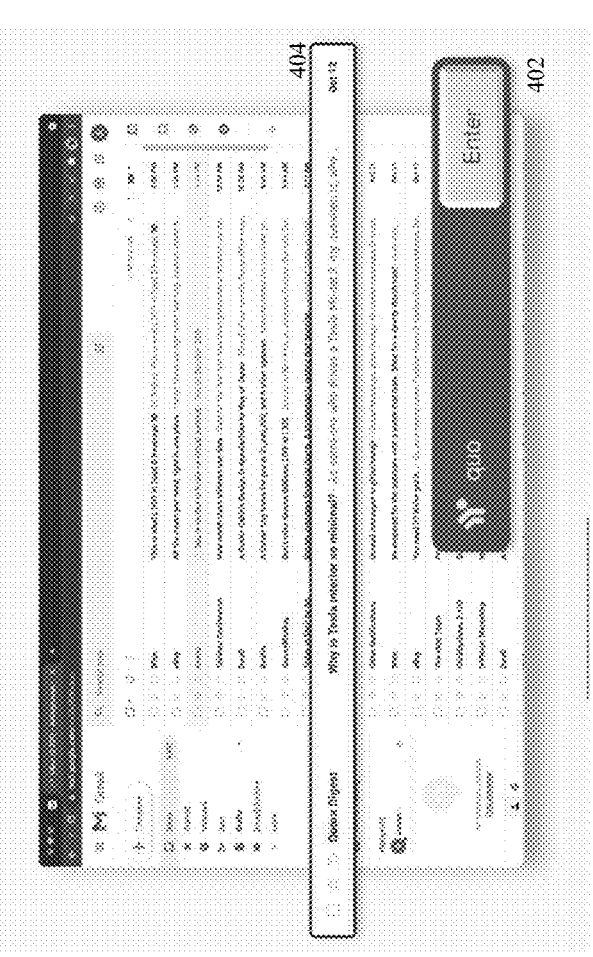

FIG. 4 depicts yet another non-limiting example. In the depicted example, the user is viewing the webpage 400, which is a list of emails received or that is associated with a user's account. When the user inputs "quo" into the input element of the graphical element 402, the analytics server highlights the identified content (e.g., displays the content 404 as larger than the rest of the content within the webpage 400). When the user interacts with the "enter" button, the analytics server instructs the web server to open that selected email.

Additionally, the analytics server may combine the method 100 described herein with speech recognition protocols to allow users to navigate most webpages without a mouse or other input elements. To achieve this result, the analytics server may execute the following steps:

In some embodiments, the analytics server may use a Web Speech API to identify the user's voice commands. For instance, when the user audibly inputs a command, the analytics server may open a search bar, such as the graphical element discussed herein. For instance, when the user says "YipYip," the analytics server opens the search bar and actively listens to the user to receive an input. For instance, the analytics server receives an input from the user and identifies the input using one or more speech recognition protocols.

The analytics server may use the methods and systems discussed herein to identify the content and visually highlight the identified content. Then the analytics server may actively listen to the user, such that the user can navigate through the highlighted content to make a selection. For instance, the user may say "YipYip next" to select a next match or say "YipYip last" to select a previous match.

When the user is satisfied with the selection, the user may say "YipYip select" to press enter and the analytics server may instruct the webserver to execute the corresponding command for the selected content.

Using the methods and systems described herein, the analytics server may provide an assistive technology to help people with disabilities as they are no longer required to use a mouse to interact with the web. Using the methods and systems described herein, a user can navigate any website on a television or remote display using a remote (using only auditory commands). Using the methods and systems discussed herein, a user can navigate the web in virtual or augmented reality settings where a mouse and/or keyboard are not always the best human-computer interaction methods.

In other embodiments, other technologies could also be combined with the method 1000 to improve the search and selection, such as computer vision, optical character recognition, and similar algorithms/processes to identify objects and text on a website, screen, or otherwise captured via a camera or sensor (e.g., in the real world) and then be able to select elements in images/videos/3D scenes regardless of whether they have the necessary text.

In another embodiment, the analytics server may also execute a natural language processing/understanding protocol to understand the user who is inputting their command in natural language. As a result, the analytics server may identify the elements on the screen that match some relevance threshold regardless of whether it is a direct keyword match. Users could then select (or perform some other action) on said element. For instance, the user may say "send an email to my wife" and the analytics server identifies the corresponding front end elements to press in the necessary sequence and can look up the necessary information for who the user's wife is from the nodal data structure or other database. Similarly, the user may say "let's move to the second option" and the analytics server identifies the "second option" and commands the webserver to navigate to the corresponding webpage.

In some embodiments, the analytics server may automatically identify the types of data being shown on a given website, as well as the functionality provided on that website (e.g., be able to identify that the electronic content is showing the compose page for "email" tool). Non-limiting examples of this include looking for classifying information within the webpage's page source (e.g., the webpage could provide the necessary configuration itself so that no external files are needed, via for example schema.org schemas and schema.org actions), looking for certain keywords and/or similarities with other known webpages (e.g., by looking at the metadata in the webpage's head tags, looking at the DOM, etc.), and the like.

In another embodiment, the analytics server may use machine learning techniques to optimize the selection process such that the correct element is selected more quickly. The analytics server may train a model to determine which highlighted content is more suitable for a particular user. For example, the trained model may determine that most users select a particular element on pages having a particular attributes (e.g., pages with Y attributes) when performing queries regarding a certain topic (e.g., queries having X attributes).

In another example, the trained model may determine that users looking at pages that have a certain attribute attributes (e.g., content that corresponds to a file, message, task, etc.) tend to request a certain type of actions (e.g., usually input a request that has a determinable attribute) on these types of elements (having some determinable attributes).

In some embodiments, the analytics server might take one or more screenshots of the webpage and use computer vision techniques to classify what the page is, what functionality it offers, what data types are visible on screen, and/or to find closeness of similarity with other applications and data types that have existing configuration files.

In some embodiments, the analytics server might leverage existing libraries of commands for certain applications and operating systems to execute commands that a user types. In other words, the analytics server could use configuration files from external systems (e.g. AppleScript) in order to execute commands in certain applications.

In some embodiments, the analytics server might use alternate methods for tracking events and/or changes to files on one or more system including, but not limited to, periodically polling for changes in the necessary systems, using kernel subsystems (like "inotify" on Linux and "kqueue" on FreeBSD/MacOS), using eBPF (e.g., to run filesystem notification and file watching programs like git), leveraging observability frameworks like OpenTelemetry and other tools like Webpack (e.g., features like Watch and WatchOptions) and Skaffold to monitor various systems, and using technologies similar to Visual Studio's Spy++(e.g., to identify all windows and UI elements that make up a given application).

The methods and systems discussed herein also apply to other types of actions beyond "selecting." For example, other commands may include "copy," "print," "save," "send," "comment," "add task," "go to next post," and the like. These actions can all be done within each system/website or in a nodal data structure described herein.

Furthermore, the actions and interactions can be used to interact with data from more than one system, application, operating system, database, website, and the like. In this way the user (human or machine) can select elements on the page and relate the underlying data to other data, such as: (1) existing data in other applications and tools like a third-party CRM, task manager, messaging tool, electronic health record, warehouse management system, etc.; (2) newly created data of various types such as a note, task, message, comment, @ mention, drawing, etc. that can be primarily stored in the nodal data structure, (3) and more.

As described above before, user actions can be tracked and used to establish edges between nodes in the nodal data structure. The analytics server may, for example, track copy-paste actions and establish back links and sources across the data being copied from and the data being copied to. This can be done by tracking keyboard shortcuts, tracking front end elements that are being clicked on, tracking the clipboard, etc. Similarly, other actions such as "open link," "move," "print," or "save as" can be tracked using similar methods, including front end components. Actions such as these and others that are unique to particular applications (e.g., creating a reference within one excel to second excel file, adding an AutoCAD block in one file with information that exists in another file, adding source material in Adobe After Effects) are able to be used to establish edges between nodes, as well as label the edges (e.g., "source," "related," "output," etc.) depending on the action being taken.

For instance, if a user is navigating the web and clicking through various links, the analytics server can keep a record of where the user navigated from when he got a particular website so that the user is always able to see where the user came from last time the user looked that the website, the link the user clicked, and where the user went from here.

For instance, the methods described herein may also be used to track what a user is doing through traditional means, such as by normally interacting the graphical user interfaces provided by each website, application, operating system, etc. If a user is printing a webpage to "save as" a PDF (or otherwise "saving as" from any given application) the analytics server may be able to track that the user is "saving as" using a variety of methods such as tracking what elements are being clicked on, using computer vision and/or optical character recognition to identify that the save dialogue is open, etc. For example, a user clicking on a "print," "save as," or "export" button within an application could be tracked as described herein and that action could be used as a trigger by the analytics server. The analytics server could then watch for any newly created files and automatically establish a relationship with a specific classification between the node representing the file, website, etc. that is open within the tracked application and the node corresponding to the newly created file. In this example, the file that was open may be automatically related as the "source" or "parent" of the newly created file that may have been identified via tracking a second system other than the open application such as the computing device's local file system. Ultimately, the analytics server is able to automatically relate the file being saved with the data being viewed.

For instance, if a user is using video editing software such as Adobe After Effects or Adobe Premier, then the user usually has to import source videos. Today, if those source videos get moved after they have been added to After Effects or Premier, the video editing file stops being able to render the edited video in the editor. Using a system like the one proposed here, the user (and Adobe After Effects) would be able to keep track of where that file was moved to and show the user the location via the nodal data structure.

FIG. 5 displays a method executed by the analytics server that tracks user actions to automatically establish, update, delete, classify, reclassify, and otherwise manage relationships between nodes in the nodal data structure. For instance, the analytics server may execute the method 500 to automatically track a user's actions on a computing device in order to automatically manage the relationships between nodes that correspond to the electronic content the user is interacting with. The analytics server, as used herein, may include a browser extension, a locally installed application, an operating system, any code running on the user's computing device (implemented by the analytics server or a third party), any code running on a remote server that is able to track electronic content, etc.

Using the method 500, the analytics server may establish a baseline by tracking user actions across different electronic contents. As used herein, electronic content may refer to any content that is outputted for a user and/or can be interacted with by the user. Non-limiting examples of electronic content may include units of works (as discussed herein), software tools, objects, units of work/nodes, and the like. The analytics server may then create links on the corresponding nodes (e.g., link the back-end nodes corresponding to the relationships identified). In some embodiments, the content monitored and tracked may belong to different data sources and/or data repositories.

Other non-limiting examples of electronic content may include units of work (e.g., a document, an image in a document, an event, comments on a document, revisions to an email). Therefore, electronic content may refer to anything that can be interacted with by a user, such as a part of a string of text within a document, the contents of a cell within a spreadsheet, an email message, a doctor's note on a patient record, part of a record/row in a SQL database, and the like.

In some embodiments, the electronic content may be the nodal data structure itself. For instance, a user (e.g., an administrator) may interact with the nodal data structure or may expressly designate certain content as related.

The method 500 may describe the analytics server monitoring actions on at least two different electronic contents in at least one software application. In a non-limiting example, the analytics server may monitor one or more actions that interact with two files within one file storage system, may monitor one or more actions that interact with two files in two file storage systems, may monitor interactions on two different electronic contents stored within one file in one application, may monitor one or more actions that interact with data in an email message and with data on a news website, and/or may monitor one or more actions that interact with data in one spreadsheet in a web application and data in a second spreadsheet on the same web application.

At step 510, the analytics server may use any of the methods described herein to monitor user activity on at least one computing device and infer relationships between data that the user is interacting with. The analytics server may automatically establish, update, delete, classify, reclassify, and otherwise manage relationships between nodes in the nodal data structure that corresponds with the data the user is interacting with.

In some embodiments, the analytics server may monitor user actions across multiple computing devices in order to infer relationship. For example, the analytics server may track a user may send data from one computing device (such as a computer) to a second computing device (such as a mobile phone) using protocols that don't leave easily accessible records (such as AirDrop, Apple's close-range wireless communication protocol) and automatically create relationships between the data on the first computing device and the data on the second computing device.

The following is a non-limiting example of an implementation of the method 500. A user viewing a certain email message in a mobile app clicks on a link that opens a page to buy a consumer product in a second mobile app. In this example, the link in the email message does not match the page that was opened in the app (e.g., due to the email using a tracking link, due to the mobile app using different URLs, etc.) and the mobile device has an application installed that allows the analytics server to monitor electronic content. Despite the mismatched link and URL between the email and product page, and because of the ability to monitor electronic content, the analytics server is able to track that this product page was opened as a result of the user clicking a link in the email message and therefore establishes a link between a node representing the email message and a node representing the product. The analytics server may classify that linkage between the email node and the product according to the action, which in this case could be "user navigated to/from". If that linkage and classification already exists, the analytics server might also increase a count associated with that classification from "1" to "2" since this would be the second time a user is navigating to that product from the email. In this way, the analytics server can automatically manage relationships between nodes according to various configurations and monitored actions. Whenever a user (e.g., the user or a system acting on behalf of the user) interacts with that product in the future, the analytics server will also be able to also access information from the email message (e.g., should it be contextually relevant).

In some embodiments, the application installed on the mobile device could monitor electronic content in a similar way to method 100. In this example, the user would elect to open the link to the product from the email message via an input element (e.g., input element 202) as described in method 100, which enables the analytics server to know exactly what operation was done on what. The analytics server can then continue tracking the electronic content of the mobile device through until the operation is completed (e.g., the desired page finishes loading) and then proceed to establish or otherwise update a back-end linkage(s) between node(s) corresponding to the electronic content identified at step 104 and nodes corresponding to newly loaded or identified electronic content.

In an alternate embodiment, the application installed on the mobile device is monitoring electronic content and doesn't require having to start with method 100. In this example, the user would elect to open the link to the product from the email message by simply clicking on it rather than by opening a separate input element (e.g., input element 202). Because the analytics server is not being directly provided with the desired action in this scenario, it could resort to monitoring the electronic content automatically (e.g., by creating and comparing caches of electronic content). For instance, when the user clicks on the link in the email message, the analytics server may track the action performed (e.g., by listening for Mouse Event or Message Event, which are types of Events in the webpage's DOM) and thereby establish or update linkages between nodes associated with changes in the electronic content.

Figure 6:
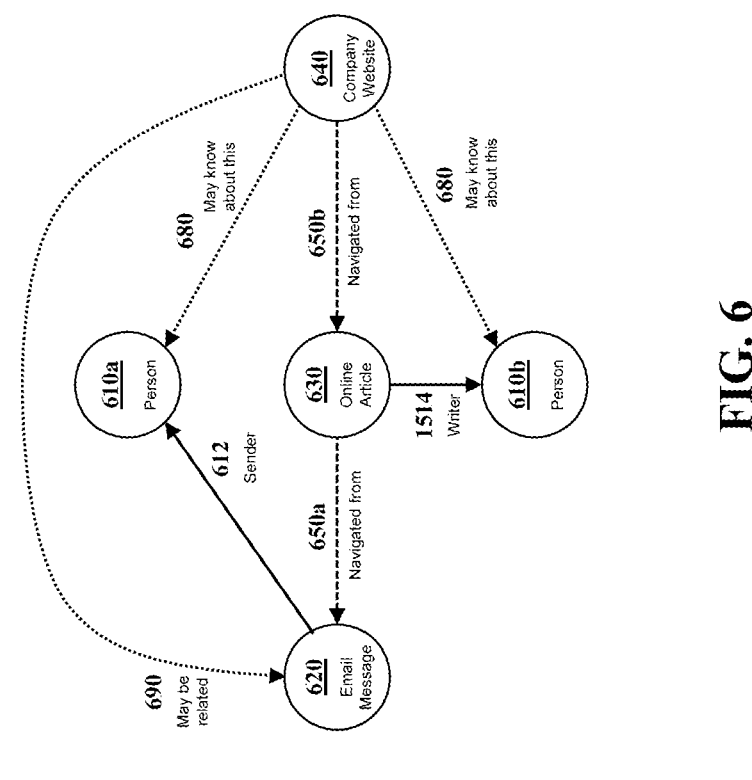
FIG. 6 illustrates a nodal data structure, according to an embodiment.

FIG. 6 shows an embodiment of the nodal data structure 600 representing several units of work that a user is interacting with. The nodal data structure 600 includes nodes for an email message 620 that was sent to the user by a person 610a, an online article 630 that was written by a second person 610b, and a company website 640 that the user is currently viewing. In this example, the analytics server may have created nodes representing each unit of work as the user interacted with each unit of work. In other words, there may not have been any connection to the various systems using backend processes such as API connections. Instead, the analytics server may have identified the necessary information to build the nodal data structure from the information available in the electronic content (e.g., it may have identified that the online article 630 was written by person 610b by looking at the schema.org information). The nodal data structure 600 may be represented through various data structures including but not limited to relational databases, NoSQL databases, object-oriented databases, graph databases, decentralized databases, and blockchains.

Referring back now to FIG. 5, at step 520, the analytics server may identify what the actions the user is performing on electronic content are and identify (and update) existing nodes or create new nodes in a nodal data structure (e.g., the nodal data structure 600) that correspond to units of work in the electronic content. The nodal data structure 600 also includes edges between nodes. These edges may have metadata such as classifications (e.g., duplicate, source, manager, etc.) with certain confidence scores, other relevancy scores, and more. In this example, edge 612 specifies that the person 610a was the sender of email message 620, and edge 614 specifies that online article 630 was written by person 610b. In some embodiments, each edge and related metadata may be represented as a node with type "relationship" that is connected to other nodes in the nodal data structure. The analytics server may read, create, update, and delete any nodes and other information in the nodal data structure as necessary to properly maintain an accurate record of the units of work and/or electronic content being represented.

In some embodiments, the analytics server may also use and/or manage additional data structures to help compare the similarities of various nodes, including but not limited to, vector databases, matrices, and the like.

The nodal data structure 600 shows how the analytics server may have monitored the user's actions and identified that the user clicked a link in the email message 620 that opened online article 630. Many email messages today have links have that go through tracking URLs before taking the user to the desired content. These tracking URLs, for example, can make it more difficult to relate linked content with the email message simply by indexing the contents of the email. Similarly, several social platforms (e.g., LinkedIn) transform links through link "shorteners" that may obfuscate the actual URL of any given webpage shared through that platform. Regardless of these obfuscated links, the analytics server may establish a relationship between email message 620 and online article 630, for example, by monitoring the user's activity and identifying that the online article 630 opened after the user clicked the link in email message 620, and before the user performed any other meaningful subsequent action. The analytics server is therefore able to automatically establish the edge 650a between the corresponding nodes and additionally add metadata to the edge 650a specifying that the user navigated to online article 630 from email message 620 and that email message 620 references online article 630. Similarly, when the user clicks a link in online article 630 that takes the user to company website 640, the analytics server may establish edge 650b.

In this way, the analytics server may track user behaviors in order to establish edges 650 between email message 620, online article 630, and company website 640. The analytics server is then able to establish relationships and recommendations between company website 640, person 610a, person 610b, and email message 620 using the various methods described herein.

Referring back to FIG. 5, at step 530, the analytics server manages relationships between nodes through tracking the user's actions. Existing data correlation methods are unlikely to be able to easily recognize these relationships, thereby losing the potential value that the structured and interrelated data may offer. For example, the analytics server could contextually present related information from any of the linked nodes at any future point in time when the user visits or searches for the company related to the company website 640.

In some embodiments, the analytics server may use additional methods to evaluate the nodes and/or the nodal structure and establish or modify relevance scores and classifications between the various nodes in order to most effectively present useful data to the user. For example, the analytics server and/or related configuration could have self-learning aspects such that it may independently learn and/or infer that certain actions suggest certain classifications of edges and/or that certain actions may provide more useful relationships and classifications than others. Several of these methods are described elsewhere herein.

FIG. 7 illustrates an alternate method executed by the analytics server to automatically establish, update, delete, classify, reclassify, and otherwise manage relationships between nodes using computer vision techniques. In other words, the analytics server may execute the method 700 to automatically track a user's actions on a computing device using computer vision techniques and then automatically manage the relationships between nodes that correspond to the electronic content the user is interacting with. The analytics server, as used herein, may include a browser extension, a locally installed application, an operating system, any code running on the user's computing device (implemented by the analytics server or a third party), any code running on a remote server that is able to track electronic content, etc.

The method 700 may describe the analytics server capturing at least one image of the electronic content being presented. The "capturing" may be done by other systems not encompassed within the analytics server. Furthermore, a computing device could capture information from non-digital sources and transform it into electronic content thereby enabling analog sources to be considered electronic content once it is captured by a computing device. In other words, the data being captured does not need to be an "image" and could be one or more videos, one or more audio recordings, and other information formats which are generally for human interaction rather than direct machine processing (e.g., a 3D scan of a 3D printed object, a picture of a printed newspaper, etc.).

At step 702, the analytics server may capture the electronic content and prepare it for use in step 704. The capturing and preparation may be performed by the analytics server or a third-party system. In various embodiments, the analytics server may use the users computing device, a remote server, and/or multiple computing devices in order to perform the various methods described herein.

At step 704, the analytics server may use computer vision methods, including but not limited to classification, object detection, and optical character recognition to identify units of work within the electronic content. The computer vision methods may be performed by the analytics server or a third-party system in order to identify open applications, images, files, text strings, URLs, file paths, locations, people, and more such as which applications are in focus, which buttons are being clicked on, what data are being selected, etc.

At step 706, the analytics server may read, identify, and/or create, nodes in the nodal data structure that correspond to the units of work identified in step 704. If a given unit of work is identified in the electronic content through step 704 but a corresponding node is not identified in the nodal data structure, then the analytics server may create a new node.

In some embodiments, the analytics server may search for similar nodes in the nodal data structure that may not be exact matches to an identified unit of work, by for example creating a vector of the identified unit of work and finding similar vectors. In some cases, if the relevance threshold falls within a certain tolerance, then the analytics server may consider them to be duplicates and thereby create a representation of a de-duplicated entity (e.g., unit of work) in the nodal data structure.

In some embodiments, the analytics server may also use alternate methods for determining similar nodes, by for example using alternate hashing functions such as perceptual hashing and locality-sensitive hashing to create unique values for various similar inputted units of work. For example, when two similar images that are passed through the same perceptual hashing algorithm end up with the same hash, they may be recalled by the analytics server according to that shared hash.

At step 708, the analytics server may read, create, update, delete, or otherwise process the edges between the identified nodes according to an action performed by the user that interacts with the nodes' corresponding units of work, by for example, using the various methods described herein (e.g., if a user copies data from one node to another, then the one node is related as a source to the other). Through this step, the analytics server may, for example, update relevance scores, classifications and certainties, as well as change other metadata related to the edge between two nodes.

The following is a non-limiting example of an implementation of the method 700. A designer is working on a computing device that has software installed that continuously records video of everything the designer is doing. As the designer starts working, the designer clicks on a file on the desktop that in turn opens a 3D modeling application. Due to the video recording of the user's screen that is presented by the computing device, the analytics server is able to use computer vision techniques to identify that a file (e.g., the first unit of work) was opened (e.g., the first action) in a 3D modeling application (e.g., the second unit of work). The first unit of work might be identified by the name and its placement on the computers' desktop and the second unit of work might be identified by the applications logo on the computing devices dock/taskbar. The analytics server might therefore be able to determine that the first unit of work is related to the second unit of work because of the first action performed by the user.

For example, the designer might decide to embed (e.g., the second action) a second file (i.e., the third unit of work) within the first file (e.g., the first unit of work). As before, the analytics server may use computer vision techniques to identify that the designer is clicking the "embed" button, and then to identify the file and path (e.g., shown in the file selection overlay) that identifies the third unit of work and thereby establish a link (and the corresponding classification and score) between the first and third units of work.

In some embodiments, entities identified in the captured video of electronic content could be used to create and manage the nodal data structure without additional external inputs. This could be done by, for example, isolating the pixels for each entity and creating an MID5 hash or a vector representation of the pixels that correspond to each identified unit of work. The analytics server could use these hashes, objects, and/or representations to identify relevant nodes and manage the nodal data structure accordingly.

In some embodiments, optical character recognition could be used together with pixel data to create more sophisticated representations of the units of work for identification and retrieval within and from the nodal data structure.

In some embodiments, the nodal data structure could be augmented by data gathered through other processes (e.g., back-end syncing processes). This would allow the analytics server to use computer vision techniques to establish words and representations as described above and then find similar images, words, and/or representations of units of work that might exist within the nodal data structure and that may have been created through other means.

The following is a second non-limiting example of an implementation of the method 700. A physician is meeting with a patient for an annual physical. During the appointment, the physician is writing notes on an analog notepad and speaking with the patient. In this example, a computing device captures audio and transforms the captured audio into electronic content at step 702. At step 704, the analytics server might use natural language processing techniques to identify the doctor's name, the patient's name, and other specifics related to the conversation such as medications and tests being discussed. At step 706, the analytics server could identify the related nodes for each entity being discussed and establish or update linkages between them accordingly. In other words, if the doctor and the patient are discussing a specific blood pressure medicine (e.g., Perindopril), then the analytics server might look up the corresponding node and create a linkage between the node representing the medication and the node representing consultation between the patient and the doctor. It might similarly classify the relationship of the linkage as "medication discussed". Similarly, if the doctor and the patient discuss specific exams, or if the doctor suggests the patient visit a particular cardiologist, then the analytics server may create and or edit the necessary nodes and edges to match the action performed (e.g., speaking).

Figure 8:
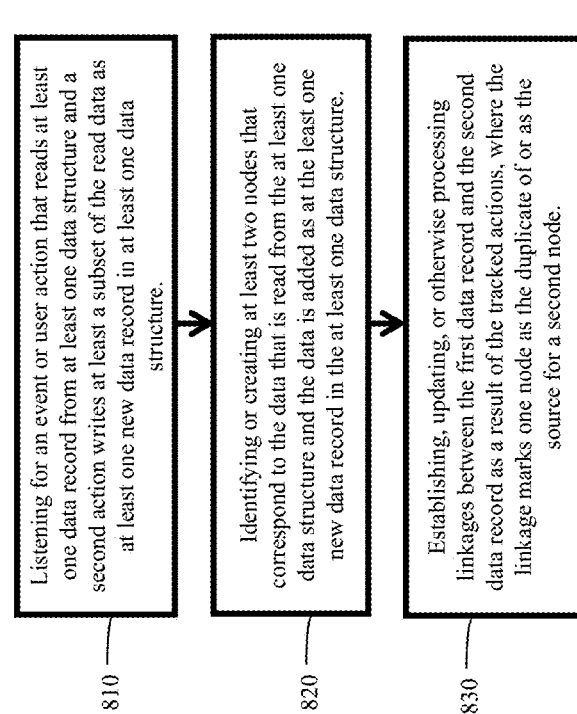

FIG. 8 displays a method executed by the analytics server to automatically establish, update, delete, classify, reclassify, and otherwise manage relationships between nodes when a user copies data from somewhere to somewhere else. In other words, the analytics server may execute the method 800 to automatically track a user's actions on a computing device using a variety of techniques and then automatically manage the relationships between nodes that correspond to the electronic content the user is interacting with to establish one node as the source for a second node. The analytics server, as used herein, may include a browser extension, a locally installed application, an operating system, any code running on the user's computing device (implemented by the analytics server or a third party), any code running on a remote server that is able to track electronic content, etc.

The analytics server may identify one user action and the corresponding nodes for that first action that reads data before proceeding to identify the second action that writes the read data at some future point in time. In other words, if the analytics server is monitoring for events such as "save as," "print," and "export," and for some reason is unable to determine where the given file was exported to, then the analytics server could automatically establish that a record in the currently open file's node that a second (as of yet unknown) file was exported from the currently open file (e.g., at a specific date and time, from a specific location, from a specific application that expects certain mime types, etc.). Therefore, at some future time, when the analytics server is able to monitor, index, or otherwise process the source of the exported file, it is able to compare the attributes of the newly discovered file with the attributes of the expected source. Should the analytics server establish that there enough of a relevance score between the expected file and the newly identified file it could automatically establish the link or recommend the link to a user for manual confirmation.

In some embodiments, the analytics server may identify a node associated with a copied content. The analytics server may then continuously track and see where the copied content was pasted. Upon identifying where the content was pasted, the analytics server may identify a node for the content (e.g., application) in which the copied content was pasted.

At step 810, the analytics server may monitor the user's computing device for actions that read data from one place and that then write the read data to a second place corresponding to the user's electronic content. In other words, the analytics server is listening to actions that are commonly referred to as "copy/paste," "cut/paste," "move," "export," "print," "save as," "render," "compile," "import," "place," "embed," "insert block," "create cell reference," and more.

At step 820, the analytics server may identify at least two nodes, or create new nodes as necessary, in nodal data structure that correspond to the identified units of work in the electronic content as described herein.

At step 830, the analytics server may read, create, update, delete, or otherwise process at least one relationship between the at least two nodes (the edge) such that the edge specifies that one node is either the duplicate of or a source for at least one other node, according to the specific action performed.

In alternate embodiments, the analytics server may identify one node at time, so long as the two nodes are identified before step 830, such that the analytics server is able to establish the necessary relationship between the two or more identified nodes at step 830.

The following is a non-limiting example of an implementation of the method 800. A user is reading a Dwell news article on a computing device that uses one or more methods to track what the user is doing and what electronic content the computing device is presenting. When the user performs a "copy to clipboard" action on an image of a house in the Dwell news article on this computing device, the analytics server is able to identify that a "copy" action was performed, regardless of whether that monitoring was done through the method 100, through monitoring keystrokes/keyboard shortcuts, through monitoring the mouse, through monitoring other events on the computing device, or otherwise. In this example, the analytics server may then identify the node or nodes that correspond with the electronic content (and/or electronic context) and the data that was copied. The analytics server may create a cache or hold that information in memory until the next "paste from clipboard" action is recognized. Once the user decides to paste that image into a PowerPoint presentation, the paste action is recognized and the analytics server establishes or modifies a linkage between the two or more corresponding nodes in the nodal data structure (e.g., the Dwell article and the PowerPoint presentation). The analytics server might also classify that one node (e.g., the Dwell article) is a source for a specific slide or asset (e.g., a third node) in the second node (e.g., PowerPoint presentation).

Then, after some time passes, the user may receive a text message to a real-estate listing on Zillow from someone. When the user opens the webpage, he may notice that the same image that he copied into the PowerPoint presentation is also shown on the Zillow listing. It is also likely however that because significant time may have passed, the user may no longer remember this image. Using the methods described herein, the analytics server may identify that this image is in the electronic content, establish a link between the real-estate listing's node and the image's node, and thereby be able to show relevant information to the user such as the Dwell article and the PowerPoint presentation. Similarly, whenever the user looks at the Dwell article, he may be able to see that the text message, the message's sender, the Zillow page, and more could be useful and relevant contexts. Furthermore, should attach the PowerPoint presentation into a message to send to someone in the future, the analytics server will be able to recommend the user that send the related text message as someone who may be a likely intended recipient.

Figure 9:
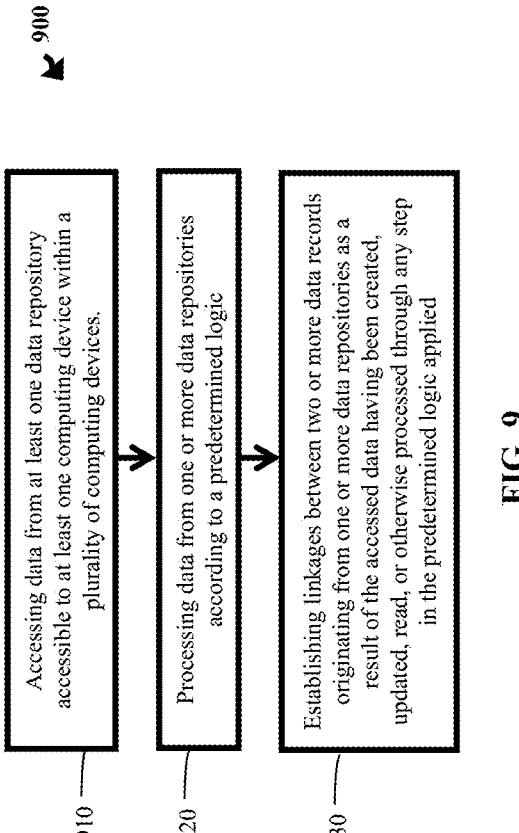

FIG. 9 displays a method 900 executed by the analytics server to automatically establish, update, delete, classify, reclassify, and otherwise manage relationships between two or more nodes in the nodal data structure when a computing device accesses data and processes it according to a predetermined logic (e.g., logic determined through an ETL or ELT tool, through an RPA tool, etc.) regardless of whether a human actor is involved in the process. In other words, the analytics server is able to automatically manage edges between nodes based on actions that may be performed by automated users or actors.

At step 910, the analytics server recognizes that a certain computer process is accessing data from at least one data repository. This access may be tracked by, for example, adding code to monitor preconfigured automations, by tracking access to records at the database level, and/or otherwise. In some embodiments, the analytics server may be accessing the data itself. In other embodiments, the analytics server may be monitoring other systems' that may access of the data.

At step 920, the analytics server either processes or monitors one or more systems that may process the data accessed at step 910 according to predetermined configuration or automation. In some embodiments, the processing may not be fully predetermined, but may instead rely partially or wholly on techniques that may be variable or continuously optimized, such as self-learning methods.

At step 930, the analytics server reads, creates, updates, deletes, classifies, and/or otherwise processes edges between nodes in the nodal data structure that correspond to the data that was read at step 910 and that was processed at step 920. As in the other examples, the edges and the metadata associated with the edges are influenced by the actions being performed at step 1820.

The following is a non-limiting example of an implementation of the method 900. In this example a computing device is autonomously accessing data from a data repository according to configuration determined in a robotic process automation (RPA) platform that the analytics server is integrate with. Therefore, once a certain trigger (e.g., a new employee is added to the HR system) meets the criteria to kick off an automated process (e.g., create all the accounts in all the necessary software tools for the new employee), the RPA platform automatically performs the automation in a way that is monitored by the analytics server. The analytics server is, as with previous examples, then able to use the monitored actions to automatically establish relationships between the various components of electronic content. In this scenario for example, the analytics server may be able to create a node for the new employee that corresponds that includes all of the accounts and related that were created by the RPA platform for that employee. The analytics server is able to do this all without having to integrate with any of the various tools that the employee accounts were made in because it was able to monitor the actions of the RPA platform. Also as before, the analytics server is then able to leverage these nodes, edges, and/or attributes in order to deduplicate data, otherwise link relevant record, more effectively classify relationships, and contextually present relevant data and actions.

Figure 10:
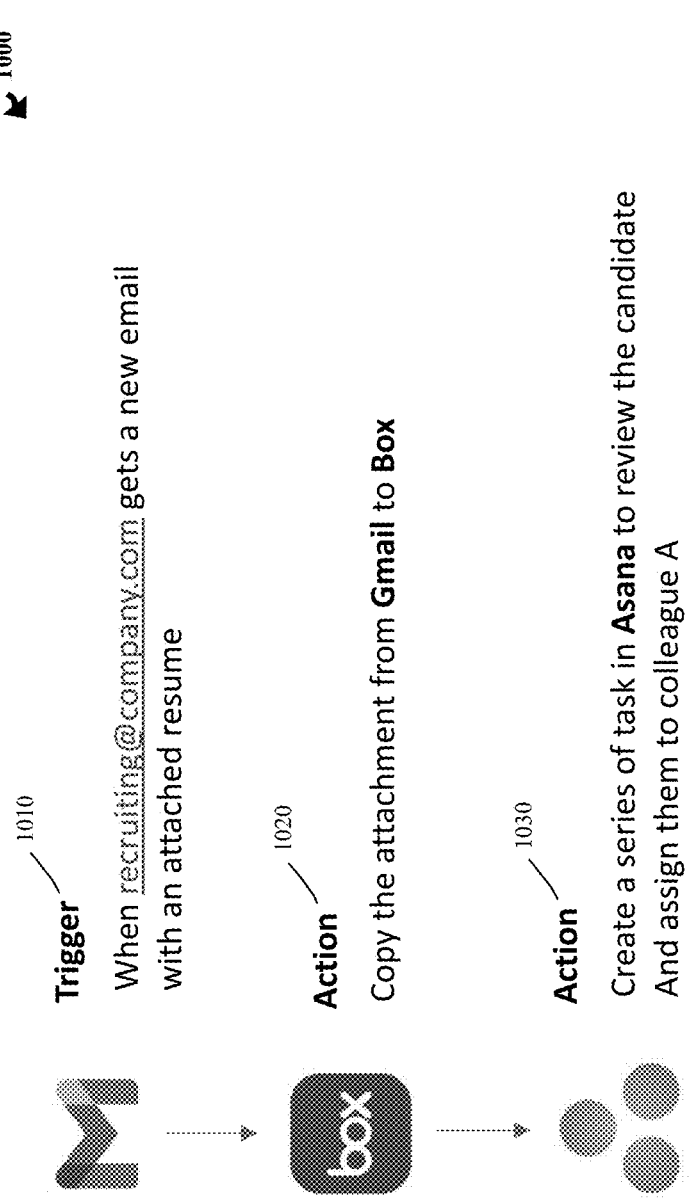
FIG. 10 illustrates operational steps for an automated workflow between third-party productivity applications, according to an embodiment.

FIG. 10 illustrates operational steps for a non-limiting example of workflow automation 1000 between third-party applications that can be established, (e.g., with a robotic process automation or "RPA" platform), wherein actions are performed automatically by a system rather than a human user (step 920). In this example, the analytics server may also track actions performed by non-human users such as systems of other software performing actions on data. For instance, the analytics server could integrate with automation tools such as Zapier, Microsoft Power Automate, Tray.io, IFTTT, and other tools that are used to copy, move, or otherwise transform data across and within tools and datasets (or offer automation features within itself, such as scraping data from web sites using a headless browser, or facilitating connections to third party APIs, and more), and then automatically track, establish, and update relationships in the nodal data structure based on the actions or automations taking place. For instance, if a connected email account receives an email including a resume, then an automated system could be used to copy and organize that resume within a file storage system, as well as create a record of a task to review said file within a different task management tool. In this case, regardless of whether the file is added or referenced in the task management tool, the analytics server would be able to relate the file in the file storage system, the message in the email service, and the task in the task manager together simply by the actions performed on them.

Alternate embodiments could include the use of any mixture of front-end actions performed by a user (such as selecting a button on the screen) and back-end actions (such as receiving a notification about an email via API endpoints) in order to establish and update the relationships in the nodal data structure.

FIG. 11 shows an embodiment of the nodal data structure 1100 with several nodes representing several units of work after a series of interactions from a human user and after the preconfigured automation 900 (discussed in FIG. 9) has run. In this example, a person 1110 has applied to public job posting 1160 by sending an email message to recruiting@company.com with her resume 1140a attached and a reference to the job posting website 1160. As described herein, the analytics server creates and/or updates the nodes for each unit of work establishes and/or manages the corresponding edges 1133, 1131, and 1132 between those nodes. The analytics server also establishes, as described elsewhere herein, an edge 1191 with a certain relevance score between public job posting 1160 and person 1110 and adds a classification recommendation to it with a certain level of certainty. The analytics server similarly infers, as described elsewhere herein, an edge 1141 with a certain classification (e.g., file permission, with type "email attachment sender") between the email attachment 1140a and person 1110. The analytics server similarly creates a node for the job posting record 1150 identified in the applicant tracking system and creates an edge 1151 between the ATS record 1150 and the public job posting website 1160, as well as inferring additional edges 1190a and 1190b between ATS record 1150 and 1130 and 1140a. Since the ATS record 1150 is related to three nodes 1130, 1140a, and 1160 that are all related to person 1110, then the analytics may also establish an edge 1190c with a certain relevance score between ATS record 1150 and person 1110.

When the user sent the email message 1130, the conditions for trigger 1010 to start the automation 1000 were met, which then proceeds to perform action 1020 and copy the attached resume 1140*a* from the email service to a specific folder in a cloud storage tool as a new file 1140*b*. In this embodiment, this causes the analytics server to automatically establish a node corresponding 1140*a* as a duplicate of a node corresponding to 1140*b* and allows the analytics server to skip any processing that may be otherwise necessary for the deduplication of both nodes (e.g., creation of MD5 hash for each file) by instead relying on an edge 1181 that specifies the two nodes 1140*a* and 1140*b* are duplicates. The analytics server may then create unified or de-duplicated node that encompasses both 1140*a* and 1140*b*. The analytics server may still do additional processing on and/or analyses of the file 1140, and may thereby recognize that the contents of the file include the URL of a LinkedIn profile 1120, the name and email of person 1110, as well as other information (e.g., bio, work experience) that matches the data on the LinkedIn profile 1120. According to this analysis, the analytics server may therefore be likely to establish the edges 1111, 1141, and 1192 between the appropriate nodes.

At step 1030, the automation 1000 proceeds to create task 1170 in a project management tool and reference the file 1140 from the task 1170. Again, since the analytics server is tracking or performing the automation, then it may establish edge 1182 between nodes that correspond to the task 1170 and to the file 1140.

The project management tool may encompass other relevant units of work independent of the automation 1000, such as other tasks 1171 and 1172 as well as a message 1173. The analytics server may create and manage nodes 1171, 1172, and 1173 as well as the corresponding edges 1175 between them. In this embodiment, the user also took a screenshot of file 1140 which was sent via message 1173, thereby enabling the analytics engine to relate the nodes 1140 and 1173 via the edge 1193. The analytics server may also reasonably infer potential relationships, classifications, relevance scores, and more (such as the inferred edges 1190*d* and 1190*e*) between task 1170, and the other nodes that were created through this automation or that are related to the nodes created through this automation.

Figure 12:
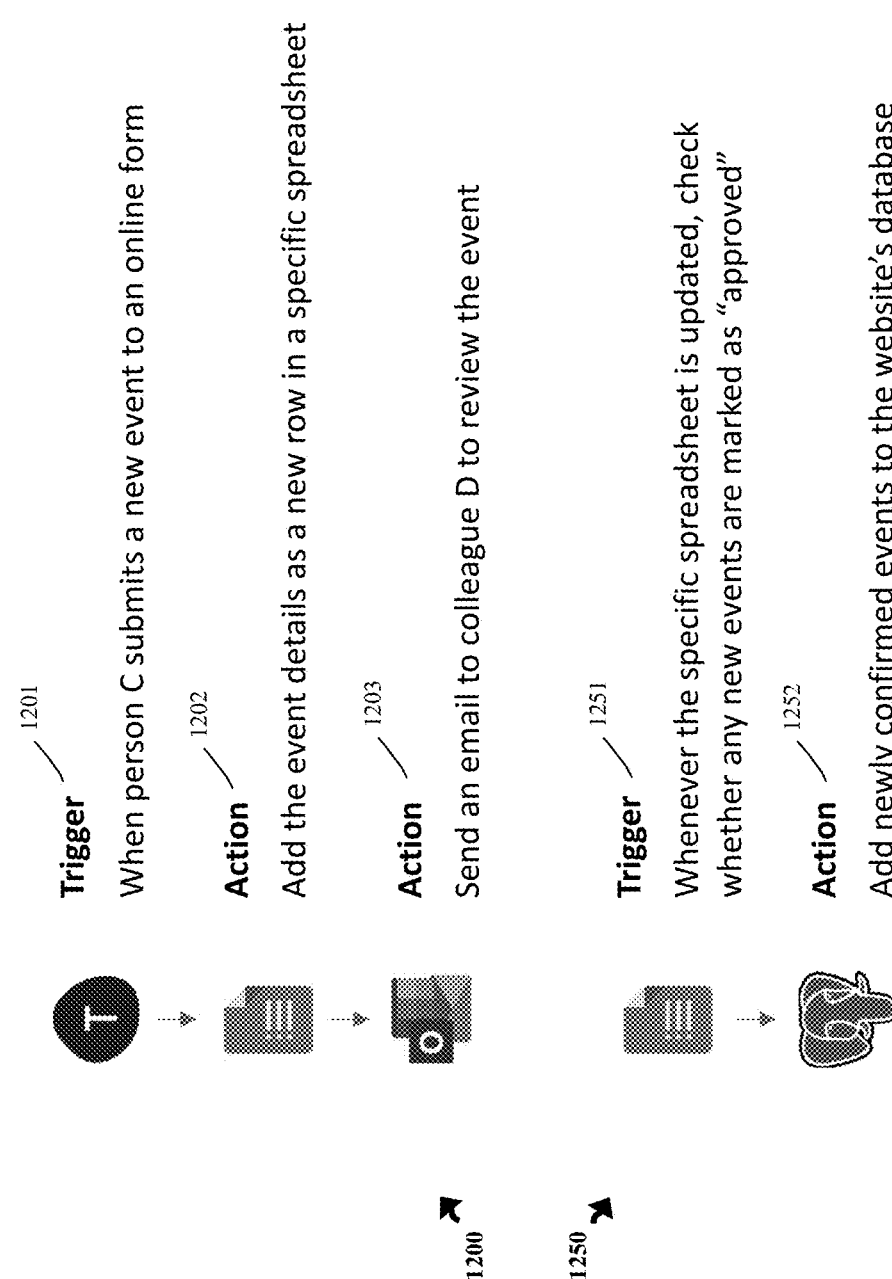
FIG. 12 illustrates operational steps for two automated workflows between third-party productivity applications, according to an embodiment.

FIG. 12 illustrates the operational steps for two related workflow automations 1200 and 1250 that read and/or write data from and/or to third-party applications via, for example, REST API endpoints associated with each third-party application, according to an embodiment. In this example, one or more users has preconfigured a series of automations that monitor third party sources for certain events that meet the criteria of the defined triggers. In other words, the user has defined (e.g., through configuration) two automated processes that use a computing device or a processor or a server (e.g., the analytics server) to monitor events and changes to data across third-party systems (such as Typeform and Google Sheets) in order identify when certain events match the criteria of predefined triggers 1201 and 1251.

Figure 13:
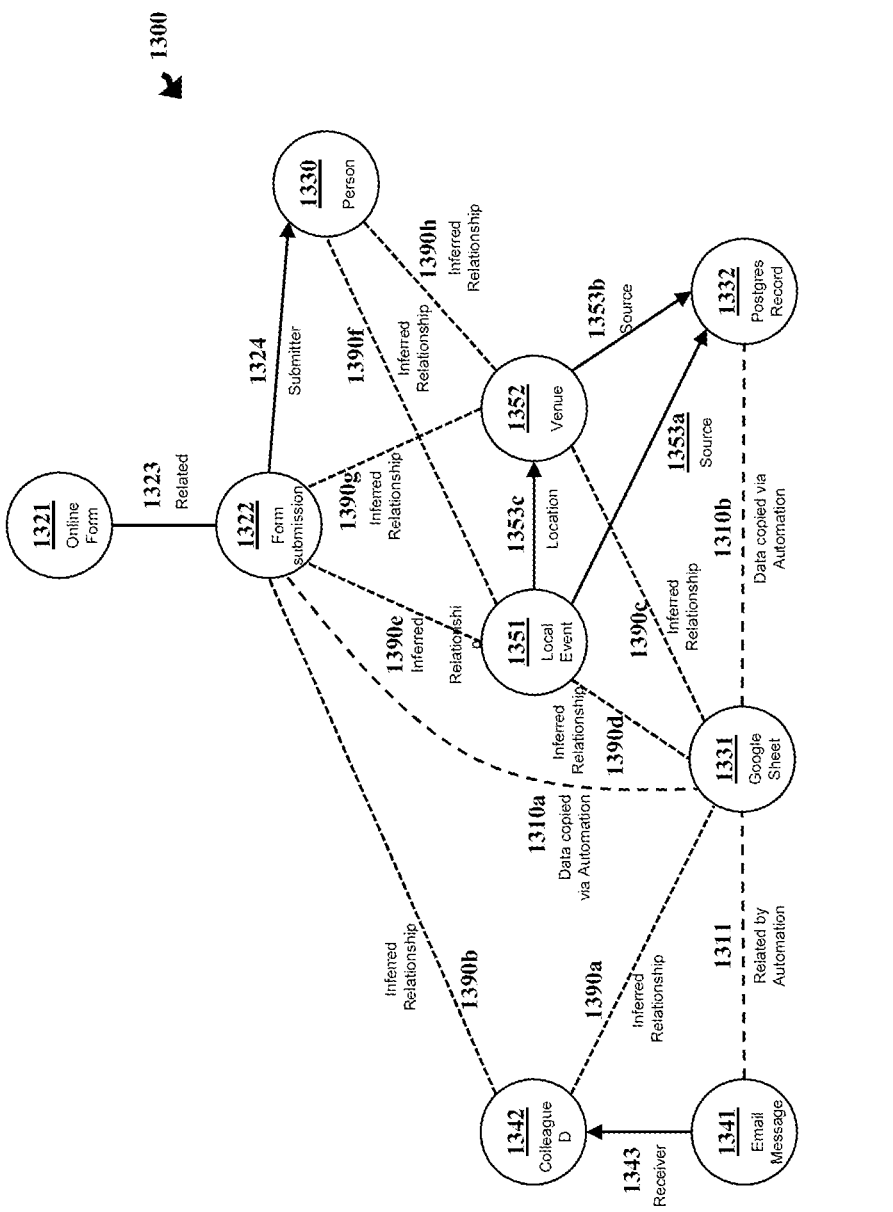
FIG. 13 illustrates a nodal data structure, according to an embodiment that corresponds with the automated workflow in FIG. 12.

Referring now to FIG. 13, which illustrates a nodal data structure, according to an embodiment related to the workflow automations 1200 and 1250. The collective purpose of the automations 1200 and 1250 is to identify when a new "Local Event" 1351 is submitted via a public-facing "Online Form" 1321 (e.g., built and published with Typeform) and to add the information from the submitted form 1322 into other systems according to the predetermined logic. In other words, the automation 1200 takes data from the submitted form 1322 and adds it into Google Sheet 1331 and the automation 1250 takes data from the Google Sheet 1331 and adds it as a record 1332 in a Postgres database.

A key innovation and improvement over traditional systems (e.g., robotic process automation systems) is that the analytics server may use the methods described herein (e.g., method 900) to automatically create and update the nodes and relationships between nodes in the nodal data structure 1300 by monitoring the actions done through automation 1200 and automation 1250. The following paragraphs describe how the analytics server monitors automations 1200 and 1250 in order to create, manage, and/or improve the nodal data structure.

According to the non-limiting embodiment, Typeform has been preconfigured to send a message to the analytics server every time someone creates a new form submission 1322 through the Online Form 1321. When the analytics server receives this message from Typeform, it may compare the message with the existing set of configurations to determine which account, and which automation process should be started if any. In other words, at step 1201, the analytics server can identify that the received message corresponds with a specific Typeform account and a specific Typeform form (i.e., the Online Form) and it can use that information to find and access the configuration for the workflow automation 1200 and proceed as configured to step 1202.

As with the other examples and embodiments described herein, the analytics server may create nodes to represent the online form 1321, the form submission 1322, and the person 1330 that submitted the form. The analytics server is also able to establish that the form 1321 and the submission 1322 are related and thereby create and manage the edge 1323 between the nodes accordingly. Similarly, the analytics server can create the linkage 1324 between the form submission 1322 and the form submitter 1330, and classify it accordingly (e.g., person 1330 submitted form submission 1322).

At step 1202, the analytics server is configured to gather information from the form submission 1322 and to use that information to create a new row in the Google Sheets spreadsheet 1331. Because the analytics server is able to monitor the automation process it is able to use method 900 to establish or otherwise manage linkages between the corresponding nodes. In this case, the analytics server may create a relationship 1310*a* between Google Sheet 1331 and form submission 1322. Moreover, the analytics server may classify that form submission 1322 is a source for Google Sheet 1331 via the edge 1310*a*.

At step 1203, the analytics server is configured to send an email message 1341 to a specific person known as colleague D 1342. As before, the analytics server may use the methods described herein to update the nodal data structure accordingly and to create nodal representation of the email message 1341 and person 1342, as well as the relationship 1343 between them. Furthermore, by monitoring the automation, the analytics server is able to establish an otherwise potentially missing linkage 1311 between the email message 1341 and the person 1342. The analytics server may also create and/or modify the attributes, properties, and/or classification on the relationship 1311. The analytics server may also create and/or modify measures of how relevant certain nodes are to one another and/or measures of confidence for certain attributes or classifications for any given edge (e.g., edge 1311).

The person 1342 might be responsible for verifying that the Local Event 1351 that was submitted by a "stranger" 1330 via form submission 1332 is appropriate for publishing on the public Local Calendar Events website. The email message 1341 might have been providing person 1342 with notice that a new event needed to be manually reviewed and approved before it could be published on the public website of Local Events. At this point the automation 1200 ends and the subsequent automation 1250 is not started until the person 1342 (or someone else) approves the newly created record in the Google Sheet 1331 for publishing on the public website. In the meantime, by establishing edge 1311, the analytics server is able to find and/or establish potentially relevant relationships that may have otherwise been missed (e.g., inferred relationships 1390a and 1390b), and can, for example, help the person 1342 easily access relevant data from the nodal data structure (e.g., Google Sheet 1331 and form submission 1322) contextually around electronic content (e.g., when person 1342 opens email message 1341).

Step 1251 is then triggered once a given row in the Google Sheet 1331 is marked as approved for publishing (e.g., by person 1342) and the pursuing action step 1252 is started. In this step 1252, data from the Google Sheets spreadsheet 1331 is automatically copied into a Postgres database that feeds the public website of Local Events and the corresponding Postgres record(s) 1332 are created (according to the databases schema).

Furthermore, because the analytics server may be monitoring the Postgres database, then the analytics server may also automatically identify new created entities in the database corresponding to the newly created Local Event 1351, and other related data such as the Venue 1352 for the Local Event. The analytics server may then create corresponding nodes 1351 and 1352 that reference the Postgres record(s) 1332 as a source and establish the corresponding edges 1353a, 1353b, and 1353c. The analytics server is then able to leverage all of the existing relationships that may have been created through the automations 1200 and 1250 (as well as other existing relationships created through other means) to recommend or otherwise create or update relationships 1390a-1390h between nodes 1351 and 1352 and other nodes in the nodal data structure.

These inferred edges 1390a-1390h can then be used by the nodal data structure to, for example, present contextually relevant information from any linked node to around any other of linked node identified in users' electronic content. For example, some alternate embodiments could include the use of nodes and linkages established by either or both front-end actions performed by a user (such as selecting a button on the screen) and/or back-end actions (such as receiving a notification about an email via API endpoints) in order to establish and update the relationships in the nodal data structure 1300.

In alternate embodiments, there can be more than one server coordinating the automations such that workflow automation 1200 is done through a server controlled by Typeform and workflow automation 1250 is done through a server controlled by Google. Similarly, in yet another embodiment, step 1202 could be configured and run through Typeform's servers and then step 1203 could be managed through a third-party robotic process automation service (e.g., Zapier). In this way the automations can be performed by multiple services so long as the analytics server is able to integrate with or otherwise monitor the automations and data interactions in order to properly and accordingly manage the nodal data structure.

FIG. 14 illustrates operational steps for an intelligently automated workflow, according to an embodiment. This non-limiting example illustrates how automated workflows can be more sophisticated and not have to rely on "if this, then that logic" that is dependent on the capabilities of external data sources and integrations. In other words and for example, rather than having to define the configuration for an automation in a way that relies on the availability of the REST API endpoints of certain external data sources, applications, and/or systems (e.g., Dropbox API), automations may be configured such that they are abstracted away from the data sources and are able to determine logic in other ways (e.g., custom logic that can be applied to all "Files" in a nodal data structure that includes "Files" from Dropbox and Google Drive, rather than having to define logic specifically for "Dropbox Files" or "Google Drive Files").

By enabling abstractions away from data sources and enabling automation logic to be defined in other ways, some embodiments also enable more sophisticated automation logic flows than would otherwise be possible. In turn these more sophisticated logic flows can enable more varied types of relationships to be automatically established and/or managed within nodal data structures.

The high-level definition of automation 1400, for example, demonstrates potential alternate workflows and alternate ways to augment nodal data structures by tracking events. This example describes a common process for prior authorizations of payments by healthcare payors or insurers. Typically, these methods involve a medical professional mailing or faxing documents about an insured patient to that patient's health insurance provider in order to get approval for a prospective procedure or treatment. These documents typically include a wide variety of documents including handwritten notes, medical histories, structured forms which the health insurers require to make a determination on whether to preapprove payment for the given procedure. Being able to configure more sophisticate logic flows like the method described in automation 1400 may enable more streamlined processing of preapproval claims by the health insurer.

At step 1401, for example, an external action (e.g., where a medical professional, such as a hospital employee, sends documents about an insured patient to the health insurance provider via fax) can be used as trigger to start a series of sophisticated logic flows that make up automation 1400.

In some embodiments, some of these sophisticated logic flows may involve human input, such as the validation of certain information when automatically generated confidence or relevance scores are not high enough. For example, at step 1402, several methods, including machine learning techniques, could be used to automatically classify the types of documents (e.g., form, invoice, prescription, test results, reports on biometric data, hand-written notes, a specific type of questionnaire, etc.) and to establish some level of confidence as to the classification of each document. Part of the configuration defined in step 1402 may include the types of documents and the models that the analytics server may use to classify the documents, as well as the confidence score thresholds that must be met in order for the automatic classification to happen. In the event that certain documents don't meet those thresholds, the analytics server may present those documents and the recommended document types to a human user for confirmation/approval. These manual interventions could in turn be used to improve the automated scoring done (e.g., by reinforcement learning) such that over time, the automation improves in quality.

As the analytics server classifies the documents received, the analytics server could then trigger a variety of different actions according to the various classifications and properties that the analytics server may have identified at step 1402. In other words, the analytics server could use the information and analyses gathered and evaluated at step

1402 to trigger different actions at step 1403 according to, for example, various configurations, models, and/or logic (e.g., logic specific to each type of document, logic specific to the type of expected data within each file type, etc.). A document that contains mostly handwritten text may require different methods for data extraction, than a document that includes a spreadsheet of previous procedures and payments to the hospital. At step 1403, various methods can be used to extract the data according to the configuration that may have been set up.

At step 1404, the analytics server may use a variety of methods to validate data, to add the extracted information to the nodal data structure, to access relevant data from the nodal data structure without permanently saving the patient's personal identifiable information (PII), to evaluate strings of text for named entities (e.g., medications, illnesses, conditions, hospitals, doctors, etc.), to perform other methods of data extraction or evaluation (e.g., to use other NLP or NLU methods to identify whether the hospital has provided enough information, to evaluate X-Rays to determine the likelihood of risk for a given condition and/or necessity for a given procedure), and/or other methods to further analyze and/or process the extracted data.

Importantly, and as with other embodiments, because the analytics server is monitoring the automation 1400, the analytics server is also able to automatically establish linkages between nodes that are representative of data that is read, created, edited, deleted, or otherwise processed through the automation 1400. For example, the analytics server may create linkages between the node that represents the hospital and the node that represents the medical professional that sent the documents, and all the other nodes created, modified, or otherwise processed through the automation, including nodes for: the documents, data extracted from the documents, analyses done over the data extracted from the documents, etc. The analytics server may also determine that different the relationships between nodes may have different relevancy scores, different types of relationships, different levels of confidence in those relationship classifications, etc.

In some embodiments, a user (e.g., a doctor) may include certain notations (e.g., "#X", "[[X]]", "//X//", "//person// X//", "//project//Y//", "//treatment//Z//", and the like) in documents, emails, handwritten notes, and more that the analytics server may be specifically configured to identify when accessing, syncing, or otherwise processing data using the various methods described herein. Whenever the analytics server identifies the specified notation, whether through front-end or back-end processes, the analytics server may initiate a particular action or automation. For instance, a TV executive at a production studio that is constantly hearing pitches in short meetings is supposed to also be taking meeting notes and adding them to the company's project tracker or CRM. In practice however, this TV executive is often on the road while taking meetings and therefore finds that taking notes by hand on actual paper or in emails messages (that are then sent to executive assistants to organize into the CRM as needed) is much easier.

While certain methods may be used to identify references to units of work within the contents of other units of work (e.g., named entity recognition, facial recognition, etc.), there are certain cases where the identification of what must be organized and how it must be organized or linked may be more nuanced. For example, if there this production company has a project for a tv show called "Sequoia," it may be unclear to the analytics server whether a reference to "Sequoia" corresponds to the national park, to the venture capital firm, to the film project, etc. The analytics may be able to infer the correct relationship and linkage through surrounding context clues (e.g., surrounding text, related nodes to the unit of work which includes the reference, etc.) as discussed elsewhere herein. However, the analytics server may not always be able to automatically infer and establish the correct linkages.

Therefore, a user might want to create, use, or modify a specific notation that the analytics server can use to identify which node to link the current unit of work to. For instance, when the TV executive is writing notes in an email message, the TV executive might also write a specific notation somewhere in the email that helps the analytics server properly link the nodes representing the email (the current unit of work) and the node representing the Sequoia TV show (the desired units of work to link to). In other words, the analytics server may be configured (at any time) to recognize certain patterns in strings of text and to perform certain actions according to certain configurations that dictate how the text should be parsed and meaning drawn from the parsed text. In the Sequoia example, the TV executive might write "Mink-ref:Sequoietype:tv show//" at the bottom of the email message to help the analytics server understand that any references to the word "Sequoia" in the email should be linked with the node that corresponds to the "Sequoia" tv show. This type of logic could, for example, be programmed into or configured within one or more steps (e.g., steps 1402, 1403, 1404) of the automation example 1400.

FIG. 15 illustrates operational steps of a method for triggering automations and inferring content relationships, in accordance with an embodiment. As with several of methods described herein, method 1500 is described as being executed by the analytics server, though other embodiments may employ other processors discussed in U.S. patent application Ser. No. 17/707,888, which is incorporated by reference herein.

At step 1510, the analytics server identifies one or more strings of text that match predetermined patterns within one or more units of work. A units of work may be processed by analytics server via front-end methods (e.g., by monitoring the DOM on a given website, using computer vision methods, other methods described herein, etc.), back-end methods (e.g., periodically scanning one or more data repositories, receiving data via webhooks, other methods described herein, otherwise monitoring data repositories, etc.), and/or otherwise. As described in the U.S. patent application Ser. No. 17/707,888 and elsewhere herein, several methods may be employed to identify and match strings of text to certain predetermined patterns for text strings (e.g., using regular expressions, using other parsers, using indexers for search, using vectors, using NLP methods, etc.). The configurations for expected or accepted text string patterns or notations may be stored in the nodal data structure, in the code for analytics server, or elsewhere.

At step 1520, the analytics server identifies the predetermined process or automation that expects the one or more text string patterns that were identified at step 1510 and uses the configuration determined by the identified process or automation to evaluate how to draw meaning from the text string. For example, "//link-ref:Sequoia//type:tv show//" may be matched to a process called "link-ref" which may be meant to only match any references to "Sequoia" within the selected unit of work with a different node in the nodal data structure that is of type "tv show" and that has the name "Sequoia." In this way, the analytics server is identifying a predetermined process or action that accepts the at least one unit of work and the at least one string of text that matches the predetermined pattern, and is identifying at least two nodes within a set of nodes of a nodal data structure that correspond to the at least one unit of work and the at least one string of text. In some embodiments, as with other methods, if a given node doesn't already exist within the nodal data structure in a usable way, the analytics server may create, edit, modify, delete, or otherwise process the node (e.g., as part of the management of the nodes and edges within the nodal data structure which happen when the analytics server may modify any nodes or edges).

In some embodiments, identified notations and patterns can also be used as triggers for automations or specific actions beyond only linking data. For example, a user might configure an automation called "add-todo" that creates a new task in a specific project management tool that refer- ences the identified unit of work. In other words, a user reading something on social media might leave a comment on a post that lists several long articles that the user is interested in reading at some point in the future. The comment the user creates may include a string of text that follows a predetermined notation that the analytics server will process at some future point in time. Continuing with this non-limiting example, when the analytics server pro- cesses the user's comment, it may parse relevant data from the string of text included in the comment which follows a predetermined notation in order to use that relevant data as inputs for a custom automation defined elsewhere. Further describing this example, the user's comment on the social post might include a string of text along the lines of //auto:add-todo//title:read articles//due:11/11/2022//. In this case, the analytics server may identify that this is a specific notation that should be processed in a specific way and look up the automation called "add-todo". Upon identifying the "add-todo" automation, the analytics server might use the automation's methods to create a task in a given project management tool called "read articles" due on "11/11/ 2022". Because the analytics server is also monitoring this "add-todo" automation, the analytics server would also be able to automatically link the social post with the created task (regardless of whether that step was included in the automation) so that the user may easily reference the desired reading list shown within the social post when looking at the newly created task.

In some embodiments, users may include more than one string of text within one unit of work (e.g., within one email message or within one document) that is mean to match and trigger more than one action, automation, or linkage with other nodes by the analytics server. In other words, a single email might include multiple (e.g., a //add-todo// and a //link-ref//) notations for the analytics server to process.

At step 1530, the analytics server executes the predeter- mined action, process, or automation identified at step 1520 with the data parsed from the at least one matched string of text and the at least one unit of work in which the string was of text was found. As a result, the analytics server establishes linkages between the at least two identified nodes (the node of the unit of work and the node parsed from the string of text) within the set of nodes of the nodal data structure based on the predetermined process or action. In some embodi- ments, the analytics server may revise an existing link, as discussed in FIG. 16.

In some embodiments, the patterns that are identified in step 1510 don't have to be strings of text. The analytics server might be able to recognize other types of patterns such as audible patterns (e.g., "YipYip link with Sequoia the tv show"), haptic patterns, other types of visual patterns, 3D patterns, patterns that incorporate changes over time, and the like. In these embodiments, the analytics server would use the pattern and the configuration defining how the relevant data can be drawn from the identified pattern in order to perform the desired action as described at step 1530 (e.g., such as linking the node identified at step 1520 for a unit of work with the a node corresponding to the TV show Sequoia, which may have been made clear through data embedded in the identified pattern).

In some embodiments, there may still be ambiguity after attempting to link nodes through notations as described in method 1500. In these scenarios, the analytics server not be able to establish a linkage with enough confidence and may therefore resort to creating a recommended relationship that may need to be manually confirmed as described elsewhere herein.

At step 1540, the analytics server may, in response to receiving a request for electronic content from a computing device: determining, by the processor, at least one node within the set of nodes of the nodal data structure that corresponds to the request; and providing/presenting, by the processor, data associated with the at least one node and additional data associated with any other node linked to the at least one node.

As discussed in the U.S. patent application Ser. No. 17/707,888, which is incorporated herein, the analytics server may receive requests and display the additional data corresponding to linked nodes as well as the requested information.

In a non-limiting example, when the user is writing a new email (e.g., initiates an email application or a messaging application) with the subject line of similar to "Sequoia show," "Sequoia episode 5," "Sequoia cast," etc., the ana- lytics server may display a prompt providing a suggestion of other emails, articles, and references that have been linked by identified notation/pattern with the node corresponding to the Sequoia TV Show.

FIG. 16 illustrates operational steps for inferring content relationships, in accordance with an embodiment. Even though aspects of the method 1600 are described as being executed by the analytics server, other embodiments may employ other processors discussed in U.S. patent application Ser. No. 17/707,888, which is incorporated by reference herein.

At step 1610, the analytics server may monitor interac- tions by a user associated with first electronic content and second electronic content presented on a computing device. The analytics server may monitor user interactions con- ducted by various users. The analytics server may monitor how users interact with various content outputted by the analytics server and/or a third-party server. As discussed herein, electronic content may refer to any data or repre- sentation of the data that can be interacted with by a user. For instance, the electronic content may refer to an application (e.g., email application) or a website that is displayed on a user's computer. The content may also refer to a file, data associated with a file (e.g., revision history of the file a timestamp of when the file was created), or the content of a file itself (e.g., a text string within a document).

In some embodiments, the analytics server may monitor how the user interacts with multiple contents (or units of work or applications) at the same time. For instance, the analytics server may monitor how a user interacts with a social profile website hosted by a third-party server (e.g., first content) and an email application (e.g., second content). The user may copy and paste contact information of a friend (e.g., Andres) from the website into an email message to a colleague (e.g., Adler) that has a subject line of "Trip to New York." Accordingly, the analytics server monitors how the user interacts with the email application (e.g., what, how, and when the email is sent and the content of the email) along with how the user interacts with the third-party-hosted website (e.g., what content was copied and pasted into the email).

In some embodiments, monitored interactions may correspond to the user's interactions with an overlay that has been provided by the analytics server, such as the overlays discussed herein (e.g., the overlays shown in FIG. 2-4, several of the overlays in U.S. patent application Ser. No. 17/707,888, etc.).

At step 1620, the analytics server may revise a link between a pair of nodes within a set of nodes of a nodal data structure based the monitored interactions, the pair of nodes comprising a first node associated with the first electronic content and a second node associated with the second electronic content.

Using the interaction monitored in the step 1610, the analytics server may create new linkages and relevancies within the nodal data structure. For instance, and continuing with the example discussed above, one or more nodes corresponding to the "New York Trip Planning" email may not be related to one or more nodes corresponding to Andres (e.g., the website). However, because the user copied Andres's information from the first content (e.g., website) and pasted it within an email that was titled "New York Trip Planning," the analytics server links the corresponding nodes (linking the website and the email). Moreover, because the website is associated with a node related a contact node (e.g., Andres) and because the email is associated with an unclassified node called "New York Trip," the nodal data structure may be revised, such that Andres is at least relevant to the New York Trip and the underlying nodes within the nodal data structure are linked.

In some embodiments, the analytics server may link the nodes as a result of identifying interactions multiple users (e.g., predetermined number of a number that satisfies a threshold) that indicate a relevance. For instance, the analytics server may link Andres and "New York Trip" only when more than three users have interactions that indicate a possible relevance.

Using the methods and systems described herein, the analytics server may create new links between nodes that were previously unlinked. Additionally or alternatively, the analytics server may revise a link that was previously created. Therefore, two nodes may have been previously linked together; and using the methods discussed herein, the analytics server may revise the link. For instance, two nodes may be linked together indicating that an employee is connected with a prospective client and may include contact information of the prospective client. Moreover, using the methods discussed herein and based on user interactions, the analytics server may revise the same link and indicate that the prospective client is also related to the employee because they are both attending a conference in future.

At step 1630, the analytics server may, in response to receiving a request for electronic content from the computing device: determine at least one node within the set of nodes of the nodal data structure that corresponds to the request; and provide data associated with the at least one node and additional data associated with any other node linked to the at least one node.

As discussed in the U.S. patent application Ser. No. 17/707,888, which is incorporated herein, the analytics server may receive requests and display the additional data corresponding to linked nodes as well as the requested information.

In a non-limiting example, when the user is writing a new email (e.g., initiates an email application or a messaging application) with the subject line of similar to "New York Trip Planning," the analytics server may display a prompt providing a suggestion of Andres's contact information. Additionally or alternatively, the analytics server may use an API to provide the data to a computing device and/or a server.

Figure 17:
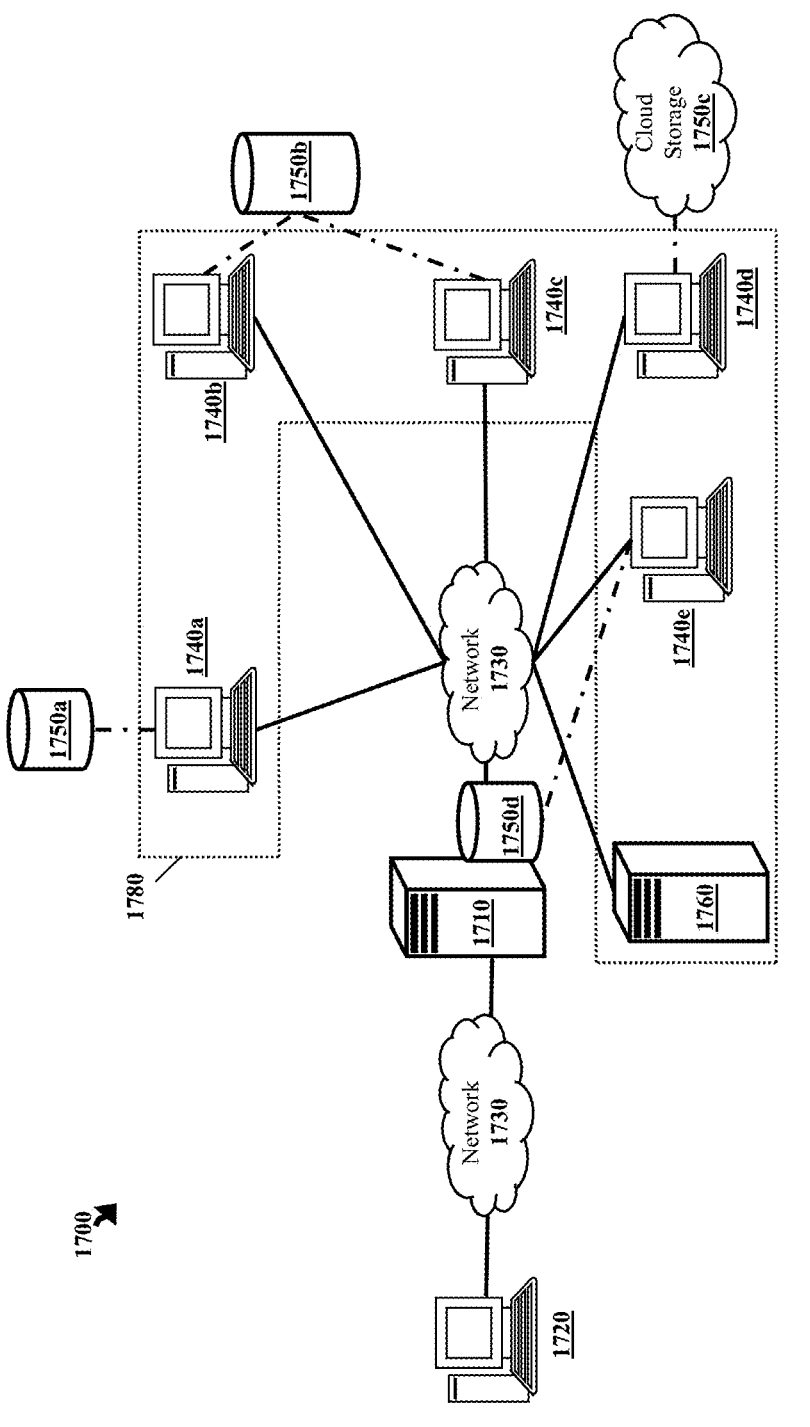
FIG. 17 illustrates components of a computer system for inferring content relationships.

FIG. 17 illustrates components of system 1700 for inferring content relationships. The electronic workflow management system 1700 may also be referred to herein at the electronic workflow management system. The electronic workflow management system 1700 may include an analytics server 1710, an administrator computing device 1720, user computing devices 1740a-e (collectively user computing devices 1740), electronic data repositories 1750a-d (collectively electronic data repositories 1750), and third-party server 1760. The above-mentioned components may be connected to each other through a network 1730. The examples of the network 1730 may include, but are not limited to, private or public LAN, WLAN, MAN, WAN, and the Internet. The network 1730 may include both wired and wireless communications according to one or more standards and/or via one or more transport mediums.

The communication over the network 1730 may be performed in accordance with various communication protocols such as Transmission Control Protocol and Internet Protocol (TCP/IP), User Datagram Protocol (UDP), and IEEE communication protocols. In one example, the network 1730 may include wireless communications according to Bluetooth specification sets, or another standard or proprietary wireless communication protocol. In another example, the network 1730 may also include communications over a cellular network, including, e.g., a GSM (Global System for Mobile Communications), CDMA (Code Division Multiple Access), EDGE (Enhanced Data for Global Evolution) network.

The electronic workflow management system 1700 is not confined to the components described herein and may include additional or alternate components, not shown for brevity, which are to be considered within the scope of the electronic workflow management system 1700.

The analytics server 1710 may generate and display a graphical user interface (GUI) on each user computing devices 1740 within a network 1780. The analytics server 1710 may also display the GUI on the administrator-computing device 1720. An example of the GUI generated and hosted by the analytics server 1710 may be a web-based application or a website.

The analytics server 1710 may host a website accessible to end-users, where the content presented via the various webpages may be controlled based upon each particular user's role. The analytics server 1710 may be any computing device comprising a processor and non-transitory machine-readable storage capable of executing the various tasks and processes described herein. Non-limiting examples of such computing devices may include workstation computers, laptop computers, server computers, cell phones, and the like. While the electronic workflow management system 1700 includes a single analytics server 1710, in some configurations, the analytics server 1710 may include any number of computing devices operating in a distributed computing environment to achieve the functionalities described herein.

The analytics server 1710 may execute software applications configured to display the GUI (e.g., host a website), which may generate and serve various webpages to each user computing device 1740 and/or the administrator computing device 1720. Different users operating the user computing devices 1740 may use the website to generate, access, and store data (e.g., files) stored on one or more of the electronic data repositories 1750. In some implementations, the analytics server 1710 may be configured to require user authentication based upon a set of user authorization credentials (e.g., username, password, biometrics, cryptographic certificate, and the like). In such implementations, the analytics server 1710 may access a system database 1750*d* configured to store user credentials, which the analytics server 1710 may be configured to reference in order to determine whether a set of entered credentials (purportedly authenticating the user) match an appropriate set of credentials that identify and authenticate the user.

As described herein a file refers to contained data available to at least one operating system and/or at least one software program. A file may contain data, such as text, video, computer program, audio, and the like. Furthermore, a file can also refer to a path associated with data. For example, a file, as used herein, can refer to a traditional file or folder on a local machine, a shortcut to a file/folder on a different machine, and/or a reference to a file/folder in an email message. Another non-limiting example of a file may include a reference to the location of a file/folder by website URL or file/folder path, a file/folder that only exists online or is not traditionally saved to a local machine's normal file. The path may not be accessible through the main system's file browser (e.g., Google Docs®, Evernote Notes®, and the like) that are not typically accessible through a computer's Windows Explorer or MacOS Finder unless explicitly downloaded to a folder in a different format that might lose either functionality or context such as related content and comments). In some configurations, the analytics server 1710 may provide an application native to the user computing devices 1740 or other electronic devices used by users where users may access the native application using the user computing devices 1740 or any other computing devices (e.g., personal electronic devices) to generate, access, store, or otherwise interact with data stored onto the electronic data repositories 1750. The native application may be any application that is directly in communication with the analytics server 1710. For example, the native application may be a mobile application, cloud-based application, universal GUI, and/or virtual/cloud-based "desktop" where users (upon being authenticated) can access, interact with, and manipulate data stored onto the electronic data repositories 1750.

In some configurations, the analytics server 1710 may generate and host webpages based upon a particular user's role within the electronic workflow management system 1700 (e.g., administrator, employee, or the employer). In such implementations, the user's role may be defined by data fields and input fields in user records stored in the system database 1750*d*. The analytics server 1710 may authenticate each user and may identify the user's role by executing an access directory protocol (e.g., LDAP). The analytics server 1710 may generate webpage content, access or generate data stored in the electronic data repositories 1750, according to the user's role defined by the user record in the system database 1750*d*. For instance, a user may be defined as a lower level employee who may not be authorized to view all related content to a particular sensitive file. Therefore, the analytics server 1710 may customize the GUI according to the user's authentication level. Furthermore, the analytics server 1710 may customize the GUI according to a user's role (e.g., function type). For instance, the analytics server 1710 may customize the GUI based on whether a user is a designer or an account manager.

In operation, when instructed by the administrator-computing device 1720 and/or any user-computing device 1740, the analytics server 1710 may execute various scanning and crawling protocols to identify and map data stored onto each electronic data repository 1750. As described herein, the analytics server 1710 may also execute various predetermined protocols to generate unique identifiers for the above-described files/data, identify related files, create a nodal data structure, periodically scan the electronic data repositories, update the nodal data structure, and display related files and context information on the above-described GUI. In some implementations, the analytics server 1710 may incorporate the GUI into a third-party application, such as a third-party email application or a file sharing/management application while preserving the "look and feel" of the third-party application.

In some configurations, the analytics server 1710 may compare unique identifiers included in the metadata of each file. For instance, a file may have metadata that includes unique identifiers associated with elements related to the file (e.g., email, tasks, storage location, and the like). In some embodiments, the analytics server 1710 may use these unique identifiers to determine whether the file is related to any other files.

User computing devices 1740 may be any computing device comprising a processor and a non-transitory machine-readable storage medium capable of performing the various tasks and processes described herein. Non-limiting examples of a user-computing device 1740 may be a workstation computer, laptop computer, tablet computer, and server computer. As depicted in FIG. 17, the user computing devices 1740 may each be operated by a user within the network 1780. In a non-limiting example, the network 1780 represents an internal network and/or collection of computing devices connected within an entity. For instance, network 1780 may represent all computing devices operated by all employees of a company. User computing devices 1740 may be internally interconnected via an internal and/or private network of the network 1780 (not shown). For instance, a company's intranet or any other private network may connect all the company's computing devices. In FIG. 17, user-computing devices 1740 are interconnected within the network 1780 (e.g., belong to the same company).

Even though the depicted user computing devices 1740 are within the same network (e.g., network 1780), it is expressly understood that the services provided by the analytics server 1710 may not be limited to computers within the same network. For instance, the analytics server 1710 may scan files accessible to one or more user computing devices that are not interconnected and are not within the same network. In some other embodiments, the analytics server 1710 may only monitor a customized and/or predetermined portion of the computing devices 1740. For instance, the administrator-computing device 1720 may customize a list of user computing device 140 and their corresponding electronic repository 1750 to be monitored by the analytics server 1710.

Each user computing device 1740 may access one or more electronic data repositories 1750 to access (e.g., view, delete, save, revise, share, send, communicate around, and the like) data stored onto the one or more electronic data repositories 1750. For instance, user-computing device 1740*a* may access data within a local database 1750*a*. User computing device 1740*b* and 1740*c* may access a shared database 1750*b*. User computing device 1740*d* may access a cloud storage 1750*c*. Furthermore, user-computing device 1740*e* may access a database operationally managed by the analytics server 110, such as the system database 150*d*. The network 1780 may also include the third-party server 1760 where one or more user computing devices 1740 utilize the third-party server 1760 to access, store, and/or manage data. An example of the third-party server 1760 may be an email server, a third party (or homegrown) electronic file management server, a public website for hosting and sharing specific file types (e.g., YouTube® for videos, Behance® for graphic files, and LinkedIn Slideshare® for presentations), or any other server used to access and/or store data files.

In some configurations, data accessible to the user computing devices 1740 may be stored in a distributed manner onto more than one electronic repositories. For instance, one or more files may be stored onto a blockchain accessible to the user computing devices 1740 where the blockchain comprises multiple distributed nodes storing data onto disparate electronic repositories. The analytics sever 1710 may retrieve a public or private blockchain key associated with each user and/or each user computing device 1740 to access the blockchain and monitor data stored onto the blockchain.

Even though different user computing devices 1740 are depicted as having, access to different electronic data repositories 1750, it is expressly understood that in different embodiments and configurations, one or more user computing devices 1740 may have access to a combination of different electronic repositories 1750. For instance, user-computing device 1740*a* may utilize the third-party server 1760 and the local database 1750*a* to store data. In another example, user-computing device 1740*c* may utilize database 1750*b*, cloud storage 1750*c* and the third-party server 1760 to access files/data. For the purpose of brevity, different combinations of different user computing devices 1740 having access to different electronic data repositories 1750 are not shown.

The foregoing method descriptions and the process flow diagrams are provided merely as illustrative examples and are not intended to require or imply that the steps of the various embodiments must be performed in the order presented. The steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, and the like. When a process corresponds to a function, the process termination may correspond to a return of the function to a calling function or a main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of this disclosure or the claims.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the embodiments described herein and variations thereof. Various modifications to these embodiments will be readily apparent to those skilled in the art, and the principles defined herein may be applied to other embodiments without departing from the spirit or scope of the subject matter disclosed herein. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A method comprising:

monitoring, by a processor, interactions by an individual user with a graphical overlay on an electronic page, wherein the interactions are associated with an instruction to perform an action on a first electronic content and second electronic content outputted and presented on a computing device;

revising, by the processor, a link between a pair of nodes within a set of nodes of a nodal data structure based on the monitored interactions, the pair of nodes comprising a first node associated with the first electronic content and a second node associated with the second electronic content; and in response to receiving a request for electronic content from the computing device:

determining, by the processor, at least one node within the set of nodes of the nodal data structure that corresponds to the request; and providing, by the processor, data associated with the at least one node and additional data associated with any other node linked to the at least one node.

2. The method of claim 1, wherein revising the link comprises creating a new link between the first node and the second node that were previously unlinked.

3. The method of claim 1, wherein the interactions comprise a copy and paste operated by the individual user.

4. The method of claim 1, wherein the interactions comprise the individual user interacting with an overlay provided by the processor.

5. The method of claim 4, wherein the overlay comprises an input element instructing the processor to perform an action.

6. The method of claim 1, wherein the interactions comprise an instruction by the individual user associated with at least one of print, save, export, import, place, send, share, add a comment, add task, or click on a hyperlink.

7. The method of claim 1, wherein the request comprises initiation of an application or outputting a third electronic content by the computing device.

8. A system comprising a non-transitory computer-readable medium having a set of instructions, that when executed, cause a processor to:

monitor interactions by an individual user with a graphical overlay on an electronic page, wherein the interactions are associated with an instruction to perform an action on a first electronic content and second electronic content outputted and presented on a computing device;

revise a link between a pair of nodes within a set of nodes of a nodal data structure based on the monitored interactions, the pair of nodes comprising a first node associated with the first electronic content and a second node previously associated with the second electronic content; and in response to receiving a request for electronic content from the computing device:

determine at least one node within the set of nodes of the nodal data structure that corresponds to the request; and provide data associated with the at least one node and additional data associated with any other node linked to the at least one node.

9. The system of claim 8, wherein revising the link comprises creating a new link between the first node and the second node that were previously unlinked.

10. The system of claim 8, wherein the interactions comprise a copy and paste operated by the individual user.

11. The system of claim 8, wherein the interactions comprise the individual user interacting with an overlay provided by the processor.

12. The system of claim 11, wherein the overlay comprises an input element instructing the processor to perform an action.

13. The system of claim 8, wherein the interactions comprise an instruction by the individual user associated with at least one of print, save, export, import, place, send, share, add a comment, add task, or click on a hyperlink.

14. The system of claim 8, wherein the request comprises initiation of an application or outputting a third electronic content by the computing device.

15. A system comprising:

a server in communication with a non-transitory computer medium comprising instructions that, when executed by at least one processor, cause the server to:

monitor interactions by an individual user with a graphical overlay on an electronic page, wherein the interactions are associated with an instruction to perform an action on a first electronic content and second electronic content outputted and presented on a computing device;

revise a link between a pair of nodes within a set of nodes of a nodal data structure based on the monitored interactions, the pair of nodes comprising a first node associated with the first electronic content and a second node associated with the second electronic content; and in response to receiving a request for electronic content from the computing device:

determine at least one node within the set of nodes of the nodal data structure that corresponds to the request; and provide data associated with the at least one node and additional data associated with any other node linked to the at least one node.

16. The system of claim 15, wherein revising the link comprises creating a new link between the first node and the second node that were previously unlinked.

17. The system of claim 15, wherein the interactions comprise a copy and paste operated by the individual user.

18. The system of claim 15, wherein the interactions comprise the individual user interacting with an overlay provided by the at least one processor.

19. The system of claim 18, wherein the overlay comprises an input element configured to instruct the at least one processor to perform an action.

20. The system of claim 15, wherein the interactions comprise an instruction by the individual user associated with at least one of print, save, export, import, place, send, share, add a comment, add task, or click on a hyperlink.

* * * * *